(12) United States Patent
McIntyre et al.

(10) Patent No.: US 6,563,235 B1
(45) Date of Patent: May 13, 2003

(54) SWITCHED CAPACITOR ARRAY CIRCUIT FOR USE IN DC-DC CONVERTER AND METHOD

(75) Inventors: William J. McIntyre, Wheatland, CA (US); Jeffrey P. Kotowski, Nevada City, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 171 days.

(21) Appl. No.: 09/678,035

(22) Filed: Oct. 3, 2000

(51) Int. Cl.[7] .............................................. H02M 3/06
(52) U.S. Cl. ....................................... 307/109; 307/110
(58) Field of Search .................................. 307/109, 110

(56) References Cited

U.S. PATENT DOCUMENTS

| | | | | |
|---|---|---|---|---|
| 5,095,223 A | * | 3/1992 | Thomas ...................... | 307/110 |
| 5,159,543 A | * | 10/1992 | Yamawaki .................. | 307/110 |
| 5,463,542 A | * | 10/1995 | Okamoto ..................... | 307/110 |
| 5,532,916 A | * | 7/1996 | Tamagawa ................... | 307/110 |
| 5,768,116 A | * | 6/1998 | Kompelien .................. | 307/110 |
| 6,055,168 A | * | 4/2000 | Kotowski et al. ........... | 307/110 |
| 6,084,789 A | * | 7/2000 | Van Lieshout .............. | 307/110 |
| 6,169,673 B1 | * | 1/2001 | McIntyre et al. ............. | 363/59 |
| 6,198,645 B1 | * | 3/2001 | Kotowski et al. ........... | 307/110 |
| 6,304,007 B1 | * | 10/2001 | Yu .............................. | 307/110 |
| 6,317,343 B1 | * | 11/2001 | Okamura et al. ........... | 307/109 |

* cited by examiner

*Primary Examiner*—Fritz Fleming
(74) *Attorney, Agent, or Firm*—Girard & Equitz LLP

(57) ABSTRACT

A capacitor array circuit having at least two capacitors, switching circuitry coupled to the capacitors and to input, output and common nodes and control circuitry. The control circuitry operates to sequentially switch the array through three different states so that a voltage is developed across each of the capacitors which is at a fixed value proportional to a voltage present at the input node. The fixed and thus determinate voltage drop across each of the capacitors operates to define voltages at any nodes intermediate the capacitors thereby, among other things, insuring reliable operation of the capacitor array circuit.

122 Claims, 18 Drawing Sheets

Gsc = 3/2

Gsc = 3/2

Gsc = 3/2

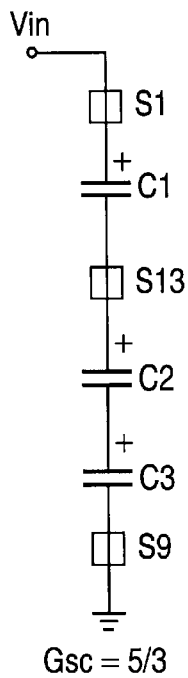
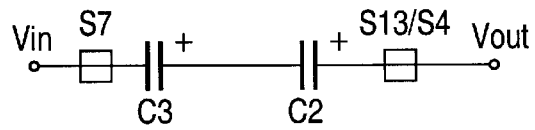
Gsc = 5/3
FIG. 9B
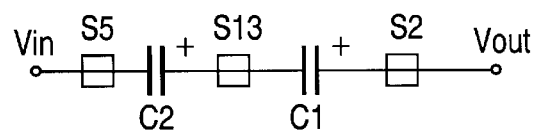
Gsc = 5/3
FIG. 9C
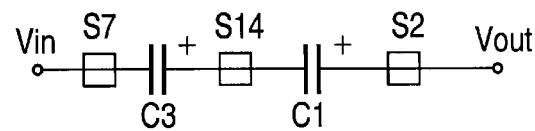
Gsc = 5/3
FIG. 9A
Gsc = 5/3
FIG. 9D
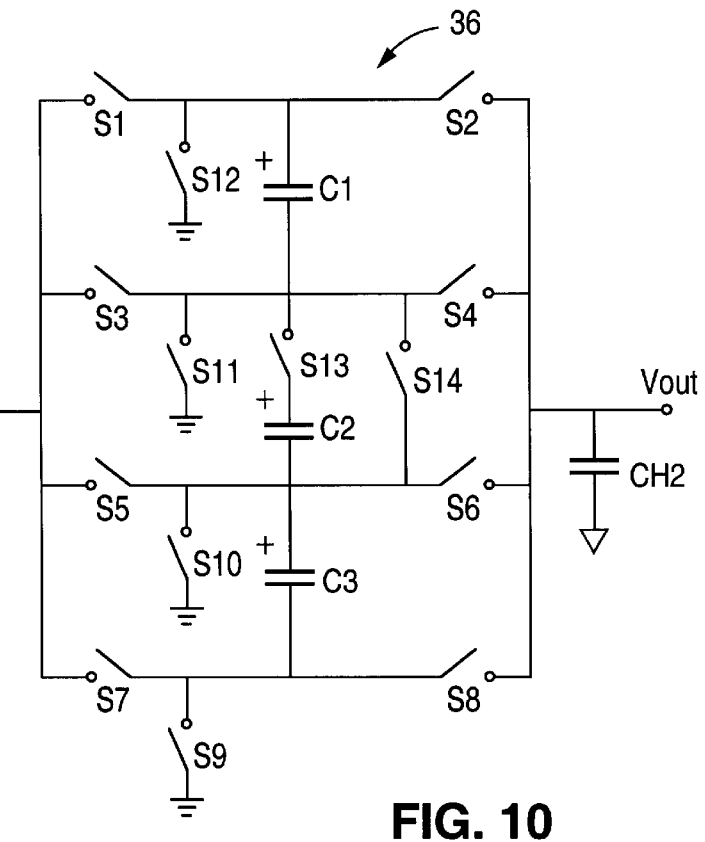
FIG. 10

Gsc = −3

Gsc = −3

Gsc = −3

Gsc = −2

Gsc = −2

Gsc = −3/2

Gsc = −3/2

Gsc = −3/2

Gsc = −3/2

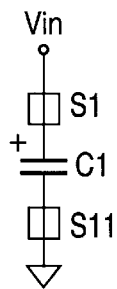
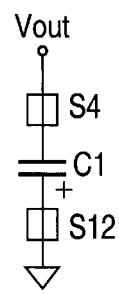
FIG. 14A
FIG. 14B
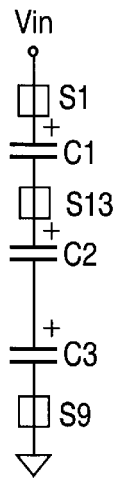
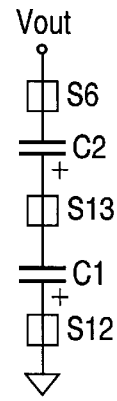
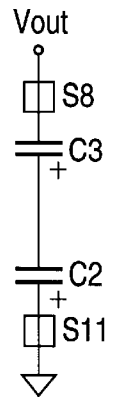
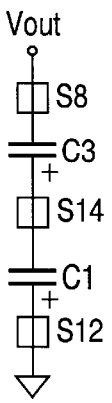
FIG. 15A
FIG. 15B
FIG. 15C
FIG. 15D
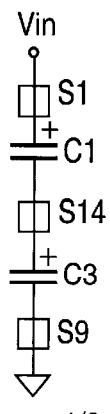
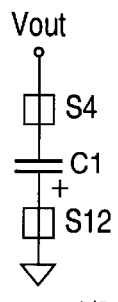
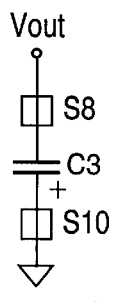
FIG. 16A
FIG. 16B
FIG. 16C

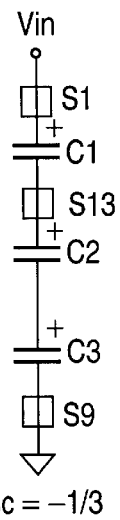
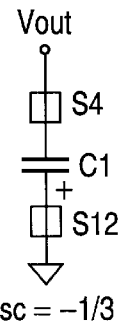
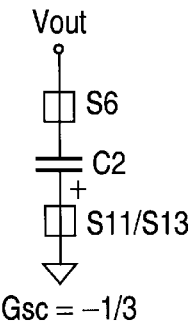
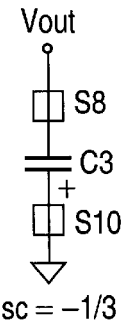
FIG. 17A  FIG. 17B  FIG. 17C  FIG. 17D
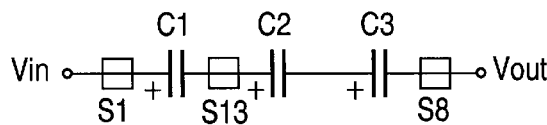
FIG. 18A
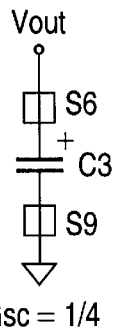
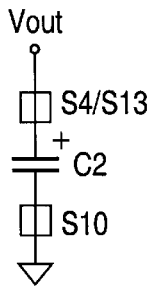
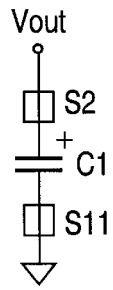
FIG. 18B  FIG. 18C  FIG. 18D
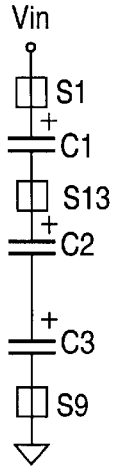
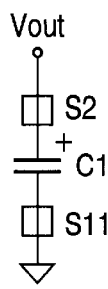
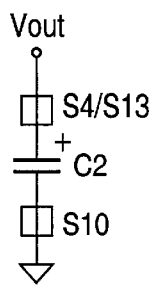
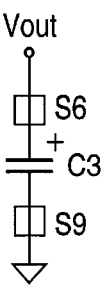
FIG. 19A  FIG. 19B  FIG. 19C  FIG. 19D

Gsc = 1/3

Gsc = 2/5

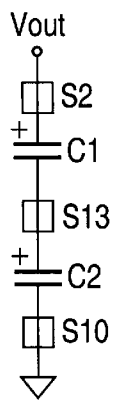
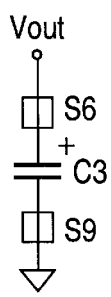
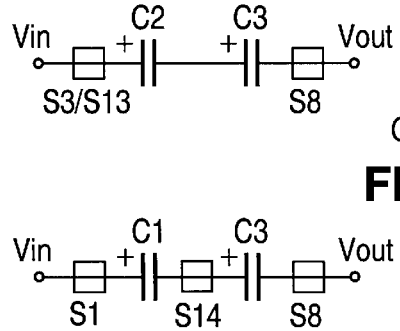
Gsc = 2/5
FIG. 22A
Gsc = 2/5
FIG. 22B
Gsc = 2/5
FIG. 22C
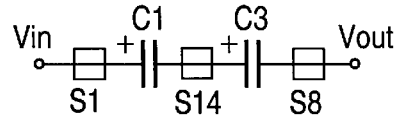
Gsc = 2/5
FIG. 22D
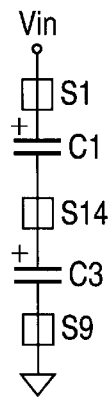
Gsc = 1/2
FIG. 23A
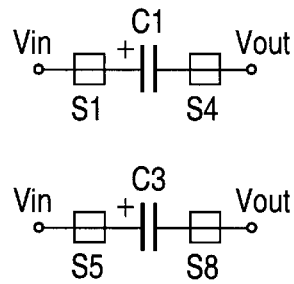
Gsc = 1/2
FIG. 23B
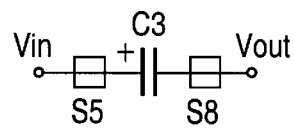
Gsc = 1/2
FIG. 23C
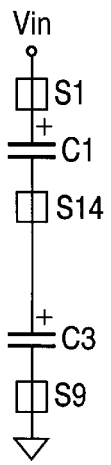
Gsc = 1/2
FIG. 24A
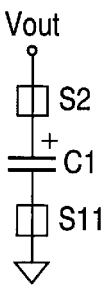
Gsc = 1/2
FIG. 24B
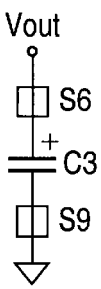
Gsc = 1/2
FIG. 24C

Gsc = 5/3

Gsc = 5/3

Gsc = 5/3

Gsc = 5/3

Gsc = 2

Gsc = 2

Gsc = 5/2

Gsc = 5/2

Gsc = 5/2

Gsc = 5/2

Gsc = 5/2

Gsc = 5/2

Gsc = 5/2

Gsc = 3

Gsc = 3

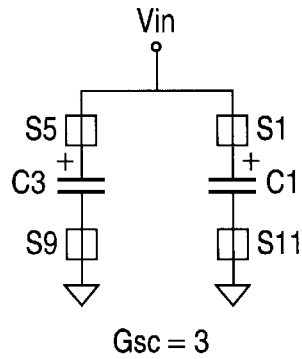
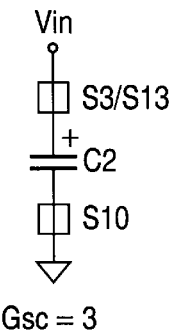
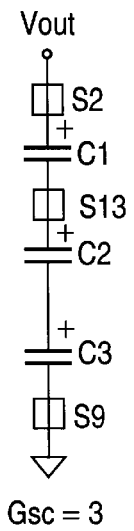
FIG. 37A     FIG. 37B     FIG. 37C
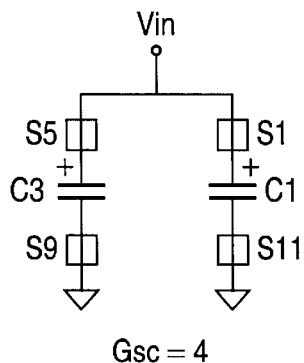
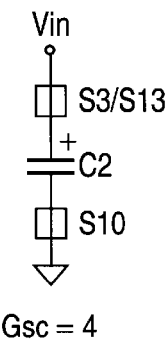
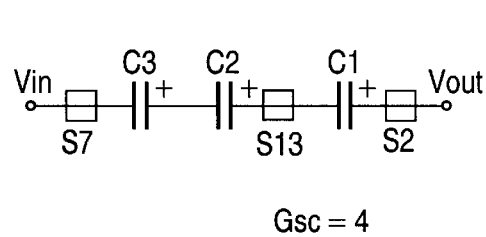
FIG. 38A     FIG. 38B     FIG. 38C
FIG. 40A
FIG. 40B
FIG. 40C
FIG. 40D

| SWITCHES | GAIN (Gsc) | | | | | | |
|---|---|---|---|---|---|---|---|
| | -3 | -2 | -3/2 | -1 | -2/3 | -1/2 | -1/3 |
| S1 | P2A | P2 | P1A | P1 | P1 | P1 | P1 |
| S2 | | | | | | | |
| S3 | P2B | | | | | | |
| S4 | | | | P2 | | P2A | P2A |
| S5 | P2A | P2 | P2B | | | | |
| S6 | | | | | P2A | | P2B |
| S7 | | | | | | | |
| S8 | P1 | P1 | P2A P2B | | P2B P2C | P2B | P2C |
| S9 | P2A | P2 | P1B | | P1 | P1 | P1 |
| S10 | P2B | | P1A | | | P2B | P2C |
| S11 | P2A | P2 | P2A | P1 | P2B | | P2B |
| S12 | P1 | P1 | P2B | P2 | P2A P2C | P2A | P2A |
| S13 | P1 P2B | | P1A P2A | | P1 P2A | | P1 P2B |
| S14 | | P1 | P2B | | P2C | P1 | |

FIG. 39A

| SWITCHES | GAIN (Gsc) | | | | | | | |
|---|---|---|---|---|---|---|---|---|
| | 1/4 | 1/3 | 1/3 | 2/5 | 2/5 | 1/2 | 1/2 | 3/5 |
| S1 | P1 | P1 | P1 P2A P2C | P1 | P2B | P1 P2A | P1 | P2B P2C |
| S2 | P2C | P2A | | P2A P2B | P1A | | P2A | P1 |
| S3 | | | P2B | | P2A | | | P2A |
| S4 | P2B | P2B | | P2C | | P2A | | |
| S5 | | | | | | P2B | | |
| S6 | P2A | P2C | P2A | | P1B | | P2B | P2B |
| S7 | | | | | | | | |
| S8 | P1 | | P2B P2C | P1 | P2A P2B | P2B | | P2A P2C |
| S9 | P2A | P1 P2C | P1 | P2B P2C | P1B | P1 | P1 P2B | P1 |
| S10 | P2B | P2B | | P2A | P1A | | | |
| S11 | P2C | P2A | | | | | P2A | |
| S12 | | | | | | | | |
| S13 | P1 P2B | P1 P2B | P1 P2A P2B | P1 P2A P2C | P1A P2A | | | P1 P2A P2B |
| S14 | | | P2C | P2B | P2B | P1 | P1 | P2C |

FIG. 39B

| SWITCHES | GAIN (Gsc) | | | | | |
|---|---|---|---|---|---|---|
| | 2/3 | 3/4 | 1 | 1 | 4/3 | 3/2 |
| S1 | P2A | P2A | P1 | P1 | P1 | P1 |
| S2 | P1 | P1 | P2 | P1 | P2A | P2A |
| S3 | | P2B | | | P2A | P2A |
| S4 | P2A | P2A | | | P2B | |
| S5 | P2B | P2C | | | P2B | |
| S6 | | P2B | | | P2C | P2B |
| S7 | | | | | P2C | P2B |
| S8 | P2B | P2C | | | | |
| S9 | P1 | P1 | | | P1 | P1 |
| S10 | | | | | | |
| S11 | | | P1 P2 | | | |
| S12 | | | | | | |
| S13 | | P1 P2B | | | P1 P2B | |
| S14 | P1 | | | | | P1 |
FIG. 39C
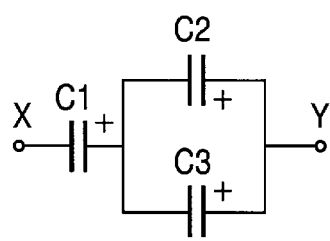
FIG. 41A
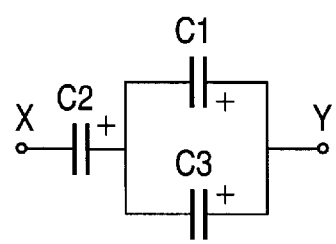
FIG. 41B
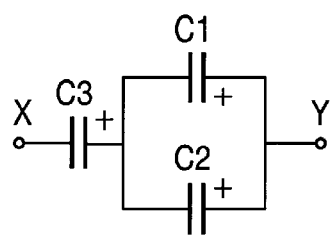
FIG. 41C

| SWITCHES | GAIN (Gsc) | | | | | | |
|---|---|---|---|---|---|---|---|
| | 5/3 | 2 | 5/2 | 5/2 | 3 | 3 | 4 |
| S1 | P1 | P1 | P1A | P2A P2B | P2 | P2A | P2A |
| S2 | P2B P2C | P2 | P2B | P1 | P1 | P1 | P1 |
| S3 | | P2 | | P2C | | P2B | P2B |
| S4 | P2A | | P2A | | | | |
| S5 | P2B | P1 | P1B | | P2 | P2A | P2A |
| S6 | | P2 | | | | | |
| S7 | P2A P2C | P2 | P2A P2B | P1 | P1 | | P1 |
| S8 | | | | | | | |
| S9 | P1 | P1 | P1B | P2B P2C | P2 | P1 P2A | P2A |
| S10 | | | P1A | P2A | | P2B | P2B |
| S11 | | P1 | | | P2 | P2A | P2A |
| S12 | | | | | | | |
| S13 | P1 P2A P2B | | P1A P2A | P1 P2A P2C | | P1 P2B | P1 P2B |
| S14 | P2C | | P2B | P2B | P1 | | |

FIG. 39D

SWITCHED CAPACITOR ARRAY CIRCUIT FOR USE IN DC-DC CONVERTER AND METHOD

BACKGROUND OF THE INVENTION

1. Field of the Invention

The present invention relates generally to electrical circuits and in particular to switched capacitor circuits for use in DC-DC converters and the like.

2. Related Art

DC-DC converters are frequently used when a DC power source, such as a battery, is used to power an electrical device, such as a cellular telephone, designed to operate at a DC voltage level different than that of the DC power source. One typical DC-DC converter utilizes a switched capacitor array circuit which includes a plurality of capacitors and electronic switching circuitry for switching the capacitors into various configurations. An exemplary DC-DC converter which utilizes such a switched capacitor array is disclosed in U.S. Pat. No. 4,451,743 entitled "DC-DC Voltage Converter".

DC-DC voltage converters having switched capacitor arrays usually have fairly high conversion efficiency and can be implemented in integrated circuit form. However, there is an increasing demand for DC-DC converters capable of even high efficiency operation. The present invention is advantageous in that high efficiency operation is achieved. This and other advantages of the present invention will become apparent to those skilled in the art upon a reading of the following Detailed Description of the Invention together with the drawings.

SUMMARY OF THE INVENTION

A capacitor array circuit for use in a DC-DC converter and the like is disclosed. The array circuit includes at least two capacitors and typically three capacitors. Switching circuitry, such as transistor switches, is coupled to the capacitors and to the input and output nodes of the array together with a third node, typically the circuit common.

The array circuit further includes control circuitry coupled to the switching circuitry for sequentially switching the array through first, second and third differing states. The capacitor configurations produced in each of the states will be such that a voltage is developed across each of the capacitors that will be fixed relative to voltages present at the input, output and third nodes. Stated in other terms, the voltage across the capacitors is forced to a fixed proportion of the voltage at the input node. Thus, for example, should the input voltage be at voltage Vin, the voltage across the capacitors will be approximately K(Vin) where K is a constant.

One aspect of the subject invention is that the three differing states provides a large number of potential gain configurations using a reduced number of capacitors and transistor switches. The large number of high gain configurations enables higher operating efficiency. The fixed voltages across each of the capacitors permits, for example, the capacitors to be connected in series in one or more of the states, with the high impedance node intermediate the capacitors being at a known and controllable voltage to ensure proper operation.

BRIEF DESCRIPTION OF THE DRAWINGS.

FIGS. 9A, 9B, 9C and 9D are equivalent circuits of the FIG. 4 array when switched to first, second, third and fourth modes or states of operation, respectively.

FIG. 10 is a third embodiment of a switched capacitor array in accordance with the present invention.

FIGS. 14A and 14B are equivalent circuits of the FIG. 10 array when switched to first and second states of operation, respectively, and which produce a gain Gsc of −1.

FIGS. 15A, 15B, 15C and 15D are equivalent circuits of the FIG. 10 array when switched to first, second, third and fourth states of operation, respectively, and which produce a gain Gsc of −2/3.

FIGS. 16A, 16B and 16C are equivalent circuits of the FIG. 10 array when switched to first, second and third states of operation, respectively, and which produce a gain Gsc of −1/2.

FIGS. 17A, 17B, 17C and 17D are equivalent circuits of the FIG. 10 array when switched to first, second, third and fourth states of operation, respectively, and which produce a gain Gsc of −1/3.

FIGS. 18A, 18B, 18C and 18D are equivalent circuits of the FIG. 10 array when switched to first, second, third and fourth states of operation, respectively, and which produce a gain Gsc of 1/4.

FIGS. 19A, 19B, 19C and 19D are equivalent circuits of the FIG. 10 array when switched to first, second, third and fourth states of operation, respectively, and which produce a gain Gsc of 1/3.

FIGS. 22A, 22B, 22C and 22D are equivalent circuits of the FIG. 10 array when switched to first, second, third and fourth states of operation, respectively, and which also produce a gain Gsc of 2/5.

FIGS. 23A, 23B and 23C are equivalent circuits of the FIG. 10 array when switched to first, second and third states of operation, respectively, and which produce a gain Gsc of 1/2.

FIGS. 24A, 24B and 24C are equivalent circuits of the FIG. 10 array when switched to first, second and third states of operation, respectively, and which also produce a gain Gsc of 1/2.

FIGS. 37A, 37B and 37C are equivalent circuits of the FIG. 10 array when switched to first, second and third states of operation, respectively, and which produce a gain Gsc of 3.

FIGS. 38A, 38B, and 38C are equivalent circuits of the FIG. 10 array when switched to first, second, third and fourth states of operation, respectively, and which produce a gain Gsc of 4.

FIGS. 39A, 39B, 39C and 39D are tables showing the various switch positions of the FIG. 10 array and the corresponding gains Gsc which result.

FIGS. 40A, 40B, 40C and 40D are waveforms for alternative non-overlapping clocks including first and second clock phases, each having two states, used to control switching of the FIG. 7 and FIG. 10 arrays to first, second and third operating states, respectively.

FIGS. 41 A–C show three states of another array.

DETAILED DESCRIPTION OF THE INVENTION

Figure 1:
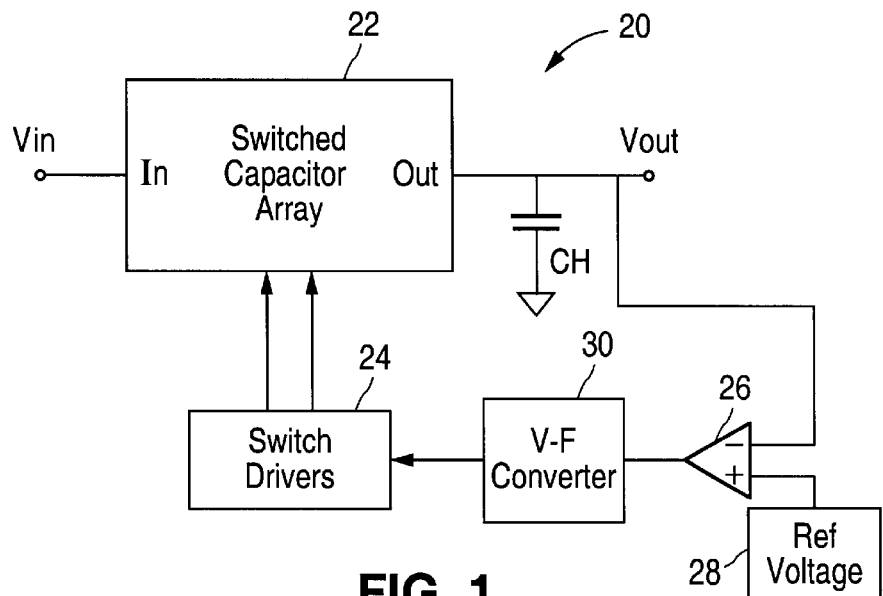
FIG. 1 is a simplified diagram of a prior art DC-DC converter which utilizes a switched capacitor array.
Figure 2:
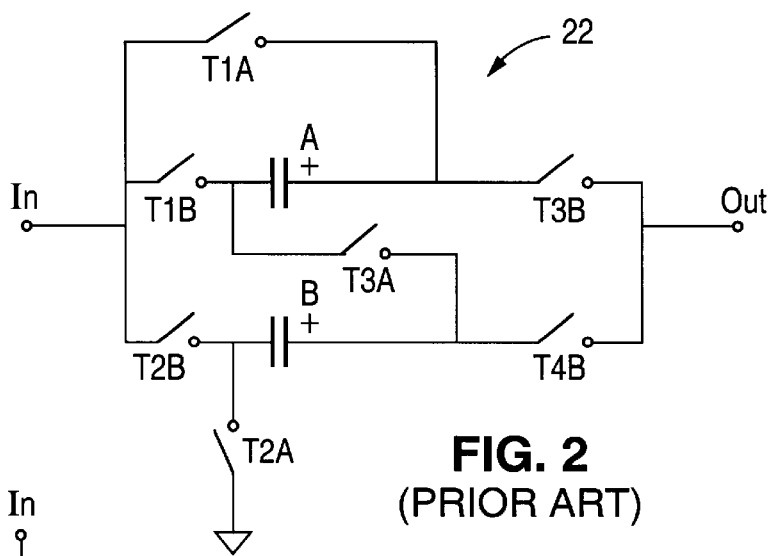
FIG. 2 is a schematic diagram of an exemplary prior art switched capacitor array of the type which can be used in the FIG. 1 DC-DC converter.

Referring to the drawings, FIG. 1 is a block diagram of a typical prior art DC-DC voltage converter 20. Converter 20 includes a switched capacitor array circuit 22, the details of which are shown in FIG. 2. Array circuit 22 includes a pair of capacitors A and B which are connected into one of two operating modes by way of transistor switches T1A, T2A and T3A together with transistor switches T1B, T2B, T3B and T4B. The transistor switches are preferably implemented using P or N type MOS depending upon the polarity and magnitudes of the voltages being switched. In some circumstances it is preferred that both P and N type transistors be used if the voltages vary over a relatively wide range. In that case, the two transistors are connected in parallel and are driven by complementary polarity drive signals.

Figure 3A:
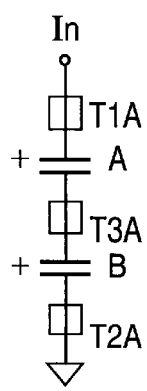
FIGS. 3A and 3B are equivalent circuits of the FIG. 2 switched capacitor array when the array is switched to a first mode and a second mode, respectively.

The drive signals for driving the transistor switches in the array 22 are generated by a switch driver circuit 24. Driver circuit 24 provides a set of drive signals to the seven transistor switches of array 22. During a first phase, switches T1A, T2A and T3A are turned on, with the remaining switches being turned off. The resultant equivalent circuit is shown in FIG. 3A. Switch T1A operates to connect the "+" terminal of capacitor A to node In, switch T3A operates to connect the remaining terminal of capacitor A to the "+" terminal of capacitor B and switch T2A connects the remaining terminal of capacitor B to ground. Note that a capacitor terminal is considered to be "facing" a node (or circuit common or ground) if the capacitor terminal is connected directly to the node or connected indirectly through one or more additional capacitors. Thus, the "+" terminal of capacitor A is facing node In whereas the other terminal of capacitor A is facing ground. Further, the "+" terminal of capacitor B is also facing node In, with the remaining capacitor B terminal facing ground.

Figure 3B:
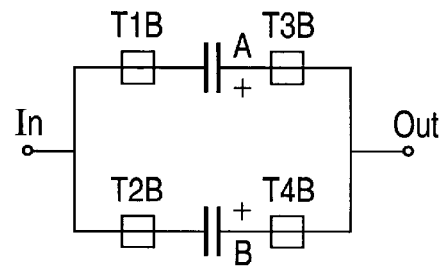

During the second phase, transistors T1A, T2A and T3A are turned off, followed by switches T1B, T2B, T3B and T4B being turned on. The resultant equivalent circuit is shown in FIG. 3B. The four conductive switches operate to connect capacitor A and B in parallel between nodes In and Out, with the "+" terminals facing the Out node. At the end of the second phase, driver circuit 24 switches the transistors back to the first phase shown in FIG. 3A, with the array alternating between the two phases.

The capacitor array provides a gain Gsc which can be determined by inspecting the equivalent circuits of FIGS. 3A and 3B. In the first phase, the total voltage drop across capacitors A and B is equal to the voltage present at node In, voltage Vin (FIG. 1). Voltage Vin is produced by a power source such as a battery or the like. Thus, the voltage across the capacitors can be expressed by the following equation:

$$Vin = V_A + V_B \tag{1}$$

where $V_A$ and $V_B$ are the voltages across capacitors A and B, respectively.

In the second phase, the capacitors are connected in parallel between nodes In and Out, with the "+" terminals facing node Out. As can be seen in FIG. 1, output voltage Vout is produced at node Out. Assuming that the charge on the capacitors has been conserved, the voltages across the capacitors can be expressed by the following equation:

$$V_A = V_B = Vout - Vin \quad (2)$$

Solving equations (1) and (2) simultaneously, it can be seen the Vout=3/2Vin, with the gain Gsc (Vout/Vin) thus being 3/2.

Referring again to FIG. 1, the output of the array 22 is connected to a holding capacitor CH and to a load (not shown). The holding capacitor CH is periodically charged by the array to compensate for the charge removed by virtue of current flow to the load. If the rate at which the array is switched between the two phases is relatively low, the array will not have sufficient time to replace the charge removed from the holding capacitor CH. Thus, charge will not be conserved between the two phases so that voltage Vout will be less than Vin times the gain of the array Gsc. As will be explained, the regulation circuitry of the FIG. 1 converter relies upon this aspect of the switched capacitor array to accomplish regulation.

The FIG. 1 converter includes a comparator circuit 26 which compares the magnitude of voltage Vout to a reference voltage produced by a reference circuit 28, with the reference voltage magnitude being equal to the desired output voltage magnitude. The comparator circuit output drives a voltage to frequency converter 30 which in turn controls the rate at which the switch driver circuit 24 switches the array 22 between the two phases. If Vout is too large, the output of comparator circuit 26 will drop thereby causing the frequency of the converter 30 output to drop. Assuming that a load is connected to the converter output, the reduction in clock rate will cause voltage Vout to drop. Conversely, if Vout is too small, the clock rate is increased thereby increasing Vout.

In order for regulation to occur, the desired value of Vout must be smaller than input Vin times the gain of the array Gsc. Assuming, for example, that Vin is +3.5 volts, the array gain Gsc of 3/2 requires that the target value of Vout be less than +5.25 volts (3.5 volts×3/2). If the target value is exactly +5.25 volts, the converter will have essentially no output current capability, with the output current capability increasing if the desired Vout, set by the reference voltage generator, is set lower than +5.25 volts if the input is higher than +3.5 volts.

The overall efficiency of the converter 22 is reduced by an amount proportional to the extent that the actual output voltage magnitude exceeds the product of Gsc times the input voltage Vin. Thus, it is desirable from an efficiency point of view, that the array operate with as small a gain Gsc, for given values of Vout and Vin, needed to provide the required minimum output current drive capability. Prior to the present invention, switched capacitor array architectures capable of providing differing values of Gsc have been relatively complex to implement. A relatively large number of transistor switches have been required which results in a large die area. If the switches are made small to conserve die area, the on resistance of the switches becomes large thereby decreasing efficiency. Even if die area is sacrificed and the switches are made large, the charge current required to turn the switches on and off becomes significant and contributes directly to the inefficiency of the converter. The prior art approaches have also typically required a relatively large number of capacitors and a relatively large number of pins thereby increasing costs and hampering miniaturization.

Figure 4:
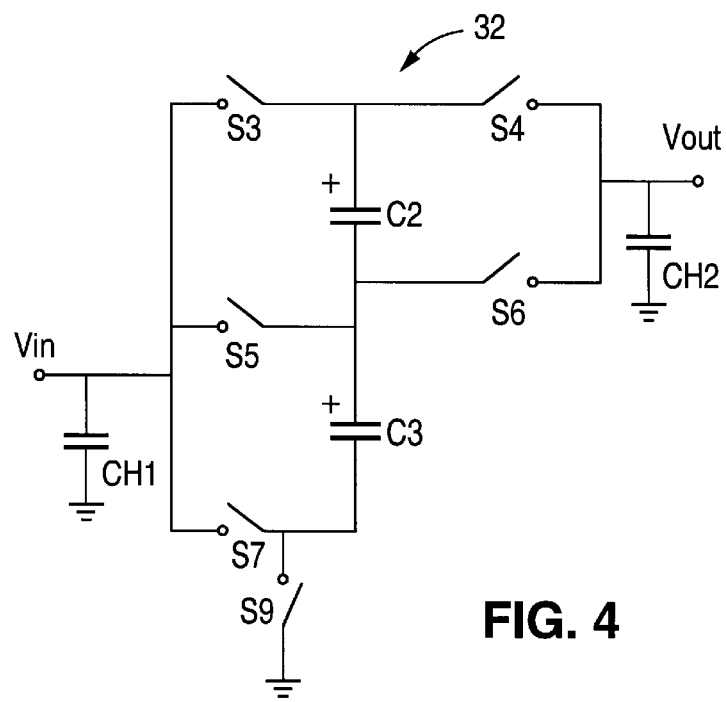
FIG. 4 is a first embodiment of a switched capacitor array in accordance with the present invention.

FIG. 4 depicts a switched capacitor array 32 for use in a converter in accordance with one embodiment of the invention. As will be explained in greater detail, array 32 is capable of being switched to a large number of gain. (Gsc) configurations, particularly in view of the relatively low number of capacitors and transistor switches utilized in the array. If less than all of the gain configurations are needed for a particular converter application, those switches and capacitors that are not utilized can be eliminated thereby further reducing the part count.

Figure 6A:
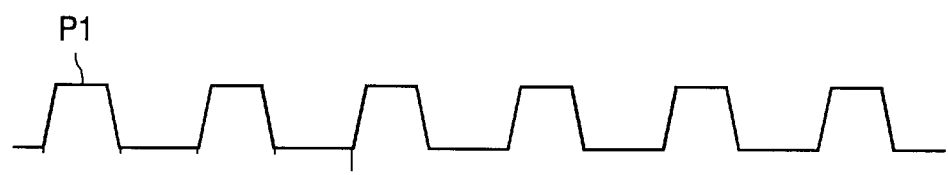
FIGS. 6A, 6B and 6C are waveforms for three non-overlapping clocks which control switching of the FIG. 4 array to the first, second and third operating states, respectively.
Figure 6B:
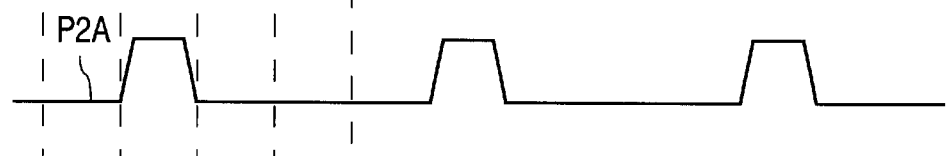
Figure 6C:
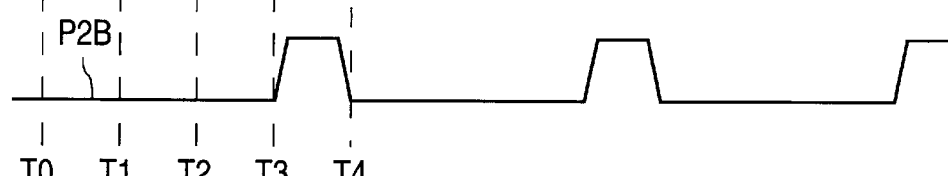

Array 32 includes two capacitors C2 and C3 which are typically of the same value. However, as will be explained, accurate gain values (Gsc) will not depend upon matching of the capacitor values. FIGS. 6A, 6B and 6C depict non-overlapping clock waveforms for controlling the timing of the switching of array 32. The waveforms can be characterized as providing first and second phases. The first phase (clock P1 of FIG. 6A) has a single state, with the second phase clocks (FIGS. 6B and 6C) having a first state P2A and a second state P2B. Each of the three clock states P1, P2A and P2B will cause the array 32 to switch to one of three array modes or states for a given array gain configuration, a given value of Gsc. For some gain configurations, less than the three clock states may be used, as will be explained.

As can be seen from FIGS. 6A, 6B and 6C, the array is switched to a the first state by clock P1 and then to the second state by clock P2A. The array is then switched back to the first state, again by clock P1, and then to the third state by clock P2B. Finally, the array is switched from the third state back to the first state by clock P1, with this sequence being repeated. Thus, it can be seen that the array is switched to the first state intermediate switching to the second and third states. In a typical application, a state machine (not depicted) that is part of the switch driver circuit 24 (FIG. 1) is used to provide a particular gain state configuration by turning on and turning off selected ones of the transistor switches S3 through S7 and S9.

Figure 5A:
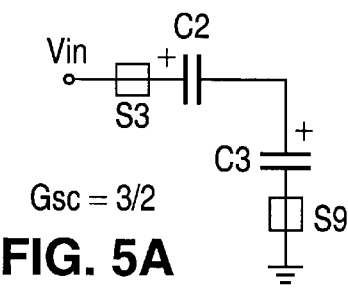
FIGS. 5A, 5B and 5C are equivalent circuits of the FIG. 4 array when switched to first, second and third modes (states) of operation, respectively.
Figure 5B:
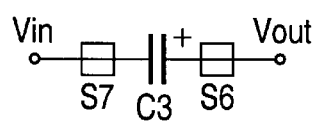
Figure 5C:
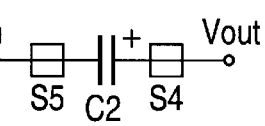

FIGS. 5A, 5B and 5C are equivalent circuits of the FIG. 4 array 32 configured to produce a gain Gsc of 3/2. When clock P1 goes active at time T0 (FIG. 6A), all of the transistor switches of array 32 are first turned off due to the non-overlapping aspect of clocks P1, P2A and P2B. Selected transistor switches S3 and S9 are then turned on as indicated by the FIG. 5A circuit so as to connect capacitors C2 and C3 in series between the input node Vin and ground, with the polarity of the capacitors being as depicted. The transistor switches are then turned off and, when P2A goes active at time T1 (FIG. 6B), switches S7 and S6 are turned on thereby connecting capacitor C3 between the input node Vin and the output node Vout. Array 32 is then in the second state. One terminal capacitor C2 remains connected, with the remaining terminal being left open so that capacitor C2 is effectively out of the FIG. 5B equivalent circuit. Array 32 is then switched back to the first state when P1 again goes active at time T2 so that the array is back to the FIG. 5A configuration. Then, at time T3, clock P2A goes active switching the array to the third state shown in FIG. 5C with capacitor C2 connected between the input node Vin and the output node Vout. Only one terminal of capacitor C3 remains connected to that the capacitor is not part of the FIG. 5C equivalent circuit. At time T4, clock P1 again goes active, with the sequence being repeated.

An important aspect of the subject invention is to force the voltages across each of the capacitors to a value which is fixed in terms of the voltages present at the input and output nodes relative to the common node. When the voltages are forced to a known value, the voltages that appear on the nodes intermediate the capacitors, the voltages present on the transistor switches, to a known values. In most cases, the voltages across each of the capacitors is set to the same value in terms of the input and output nodes Vin and Vout.

In the first state of FIG. 5A, it can be seen by inspection that the total voltage drop across capacitors C2 and C3 is equal to the input voltage Vin. However, the node intermediate capacitors C2 and C3 is a high impedance node which could otherwise assume any one of a wide range of voltages other than a voltage equal to Vin/2. This would be true regardless of the relative sizes of the two capacitors. However, the second and third states of FIGS. 5B and 5C connect the two capacitors between the same two nodes thereby insuring that the voltage drop across the capacitors are nominally equal and which are at a fixed value relative to the input voltage Vin. Since, as will be described below, there is a fixed relationship between the voltage Vin and output voltage Vout (Gsc), the voltage across the two capacitors can be also be considered to be fixed relative to the output voltage Vout. Thus, the high impedance node intermediate the two capacitors in the first state will not be at some indeterminate voltage, but rather, will be at a voltage which remains substantially equal to Vin/2, ignoring the change in voltage due to discharge to a load during the second and third states.

Assuming that the voltage drop across each capacitor is the same, inspection of FIG. 5A shows that the voltage across capacitor C2 (or C3) is Vin/2. It can then be seen by inspection of FIG. 5B (or FIG. 5C) that the output voltage Vout can be expressed as the sum of Vin and Vin/2 so that the gain is as follows:

$$Gsc=Vout/Vin=3/2 \quad (3)$$

It would appear that the second and third states could be combined to a single state where capacitors C2 and C3 are both connected in parallel between nodes Vin and Vout at the same time as shown in prior art FIG. 3B. However, an examination of array 32 indicates that there are an insufficient number of transistor switches to provide this combined state. This illustrates an important feature of the present invention, which is to maximize the number of potential gains Gsc while minimizing the number of capacitors and transistor switches. As will become apparent, the basic structure of the array of FIG. 32 together with the switch control circuitry can be modified, depending upon the needed gain Gsc, by adding capacitors and switches and by eliminating switches.

Figure 7:
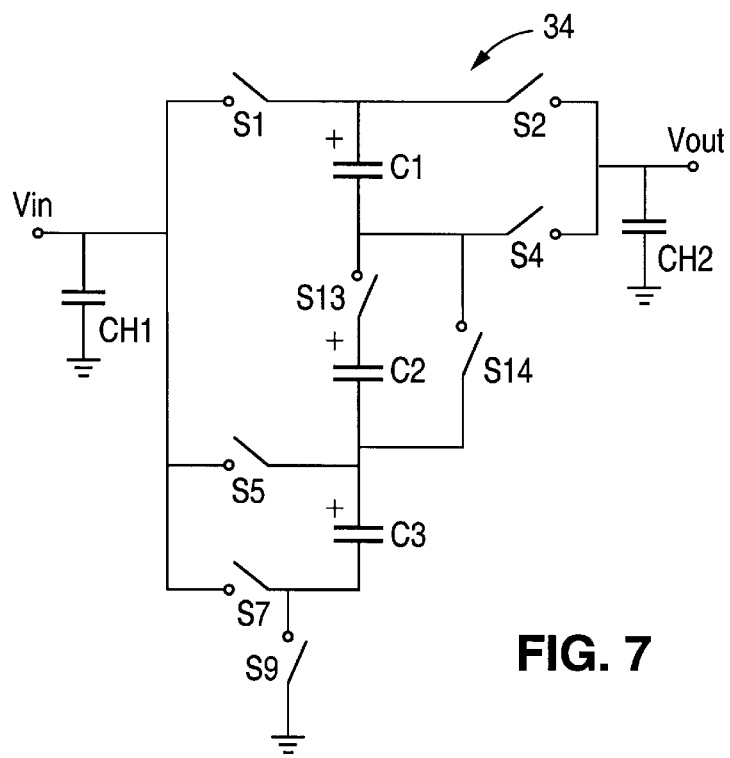
FIG. 7 is a second embodiment of a switched capacitor array in accordance with the present invention.
Figure 8A:
FIGS. 8A, 8B, 8C and 8D are waveforms for four non-overlapping clocks used to control switching of the FIG. 7 and FIG. 10 arrays to first, second, third and fourth operating states, respectively.
Figure 8B:
Figure 8C:
Figure 8D:

The array 34 of FIG. 7 is an expansion of array 32 of FIG. 4. A third capacitor C1 is added to capacitors C2 and C3 of array 32 along with transistor switches S1, S2 and S14. In addition, switch S3 of the FIG. 4 array 32 has been eliminated. Array 34 can be clocked so that the array will have up to four states. For example, a first phase clock P1 as shown in FIG. 8A can be used having a single state together with a second phase clock P2 having three states, including P2A (FIG. 8B), P2B (FIG. 8C) and P2C (FIG. 8D). Again, the second phase clock is interleaved with the first phase clock so that, for example, after an active clock P1, clock P2A goes active, followed by clock P1 again, followed by clock P2B, followed by clock P1 and then followed by clock P2C.

FIGS. 9A, 9B, 9C and 9D are equivalent circuits based upon the FIG. 7 array for the first, second, third and fourth states, respectively, which produces a gain Gsc of 5/3. During the first phase, when P1 is active, the transistor switches are controlled to connect capacitors C1, C2 and C3 in series between the input node Vin and ground with the polarity shown in FIG. 9A. This is accomplished by turning on transistor switches S1, S13 and S9 of the FIG. 7 array 34. During the second phase, first state, when clock P2A is active, FIG. 9B shows that switches S7, S4 and S13 are turned on so that capacitors C3 and C2 are connected in series between Vin and Vout with the positive terminal of the capacitors facing node Vout.

When clock P2A goes inactive, clock P1 again goes active thereby returning array 34 back to the configuration of FIG. 9A. Next, clock P2B goes active producing the configuration of FIG. 9C, with switches 5, S13 and S2 being conductive. In this configuration, capacitors C2 and C1 are connected in series between nodes Vin and Vout. Array 34 returns to the FIG. 9A configuration when P1 goes active and then switches to the FIG. 9D configuration when P2C goes active (FIG. 8D). Switches S7, S14 and S2 are turned on thereby connecting capacitors C3 and C1 in series between nodes Vin and Vout.

It can be seen that by switching the three capacitors C1, C2 and C3 in three pairs (C3/C2, C2/C1 and C3/C1) in series between the input node Vin and the output node Vout as shown in FIGS. 9B, 9C and 9D, a voltage will be produced across each of the capacitors that is fixed in terms of the voltages present at the input and output nodes. These voltages, VC1, VC2 and VC3, the voltage drops across capacitors C1, C2 and C3, respectively, and can be expressed as follows:

$$(Vout-Vin)=VC2+VC3=VC2+VC1=VC3+VC1 \quad (4)$$

or $$VC1=VC2=VC3=(Vout-Vin)/2 \quad (5)$$

By inspection of FIG. 9A, it can be seen that the following applies:

$$Vin=VC1+VC2+VC3 \quad (6)$$

Combining equations (5) and (6) establishes that the gain Gsc=Vout/Vin=5/3. Since a known voltage is produced across each of the three capacitors, the voltages at the various nodes intermediate the capacitors, such as the voltages at switches S13 of FIG. 9A, will be at a relatively fixed value to ensure proper operation of the array circuit. Note also that other gains Gsc can be obtained using array 34 of FIG. 7 as will become more apparent.

FIG. 10 is an array 36 which is a further expansion of array 34 (FIG. 7), which itself is an expansion of array 32 (FIG. 4). Array 36 is similar to array 34 with the addition of more transistor switches so as to provide a greater number of potential gains Gsc. Array 36 is controlled by the FIG. 8A, 8B, 8C and 8D clocks or modification of the clocks.

FIGS. 39A through 39D are tables setting forth the large number of gains Gsc that can be obtained using array 36. Many of the entries will also be applicable to the more basic arrays 32 and 34. The left-most column contains the switch numbers S1 through S14 of the array, with the remaining columns each corresponding to a particular gain Gsc. The row adjacent a particular switch shows that state of the switch for each of the gains Gsc. The symbol P1 indicates that the switch is conductive when clock P1 (FIG. 8A) is active, the symbol P2A indicates that the switch is conductive when clock P2A (FIG. 8B) is active and symbols P2B and P2C indicate that the switch is conductive when clocks P2B and P2C (FIGS. 8C and 8D) are active, respectively. As will be described, certain gains will use less than four states created by the four clocks P1, P2A, P2B and P2C. In that event, the clocks shown in FIGS. 6A, 6B and 6C may be used and possibly other clocks.

Some exemplary gain configurations will now be discussed. Assume that array 36 is to operate with a gain Gsc of −3. The table of FIG. 39A shows for Gsc=−3 that the switches are controlled by clocks P1, P2A and P2B as shown in FIGS. 6A, 6B and 6C so that there are three array states. When clock P1 is active, FIG. 39A indicates that switches S8, S12 and S13 are turned on, with the remaining switches being off. This produces the equivalent circuit of FIG. 11A with capacitors C1, C2 and C3 being connected in series between the output node Vout and ground, with the "+" capacitor terminals facing the ground connection. When clock P2A is active, FIG. 39A indicates that switches S1, S5, S9 and S11 are on, with the remaining switches being off. This produces the equivalent circuit of FIG. 11B where capacitors C1 and C3 are connected in parallel between the input node Vin and ground, with the "+" terminals facing the input node. Finally, when clock P2B is active, capacitor C2 is connected between the input node Vin and ground, with the "+" terminal facing the input node. This is accomplished turning on switches S3, S10 and S13 with the remaining switches being off. Thus, switches S2, S4, S6, S7 and S14 are not used in this configuration and can be deleted from array 36 in the event a gain Gsc of −3 is the only desired gain.

Figure 11A:
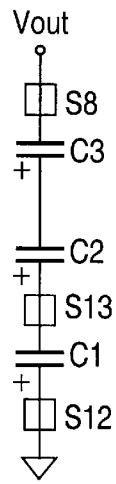
FIGS. 11A, 11B and 11C are equivalent circuits of the FIG. 10 array when switched to first, second and third states of operation, respectively, and which produce a gain Gsc of −3.
Figure 11B:
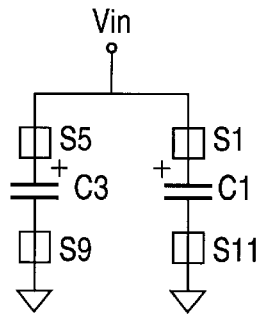
Figure 11C:
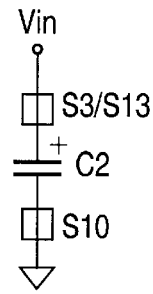

The circuits of FIGS. 11B and 11C operate to set the voltage drop across all three capacitors C1, C2 and C3 to be equal to Vin. The capacitors are reversed when connected as shown in FIG. 11A so that inspection reveals that Vout is equal to −3Vin thereby providing a gain Gsc=Vout/Vin=−3. Note that one of the states could be eliminated by combining the circuits of FIGS. 11B and 11C so that all three capacitors are connected in parallel between the input node Vin and ground in a single state. However, this would require that the "+" terminal of capacitor C3 be capable of being disconnected from the non "+" terminal of capacitor C2 so that C2 and C3 can both be connected in parallel with "+" terminals connected to the input node. Thus, an additional switch would be required to provide this disconnect function.

Figure 12A:
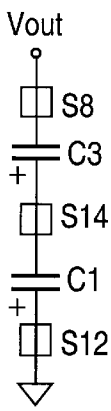
FIGS. 12A and 12B are equivalent circuits of the FIG. 10 array when switched to first and second states of operation, respectively, and which produce a gain Gsc of −2.
Figure 12B:
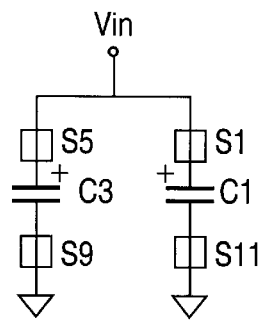

FIGS. 12A and 12B are equivalent circuits of array 36 which utilizes only two of the three capacitors and two clocks P1 and P2 to produce a Gsc=−2. This can be seen in FIG. 39A table. Clock P1 is shown in FIG. 8A. Clock P2 can readily be produced from the circuitry that produces clocks P2A, P2B and P2C since P2 is simply all three of these clocks "ORed" together. The parallel connection of FIG. 12B establishes that the voltage across capacitors C1 and C3 is Vin so that the two capacitors, when connected in series, with the polarity shown in FIG. 12A, produces and output voltage Vout equal to −2(Vin) so that Gsc=−2.

It should be noted that the use of two capacitors connected electrically as shown in FIGS. 12A and 12B to provide a gain Gsc=−2 is conventional since only two states are used. However, it is not conventional to produce that gain as shown in FIGS. 12A and 12B using an array such as array 36.

The FIG. 39A table also shows the switch closures necessary to provide a gain Gsc=−3/2. The first and second phase clocks each have two states so that non-overlapping clocks P1A, P1B, P2A and P2B are utilized as shown in FIGS. 40A, 40B, 40C and 40D, respectively. Note that these clocks can be readily produced from the clocks of FIGS. 8A, 8B, 8C and 8D.

Figure 13A:
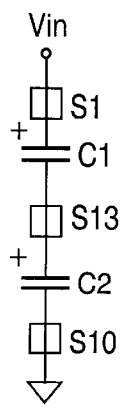
FIGS. 13A, 13B, 13C and 13D are equivalent circuits of the FIG. 10 array when switched to first, second, third and fourth states of operation, respectively, and which produce a gain Gsc of −3/2.
Figure 13B:
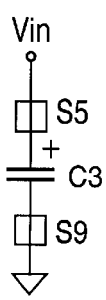
Figure 13C:
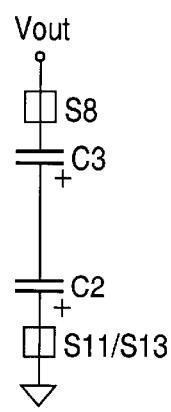

As shown in the FIG. 13A, and as indicated by the table of FIG. 39A, switches S1, S10 and S13 are turned on when clock P1A, the first state of the first clock phase, is active. This causes capacitors C1 and C2 to be connected in series between the input node Vin and ground. During the second state of the first clock phase, when clock P1B is active, switches S5 and S9 are turned on thereby connecting the third capacitor C3 between the input node and ground. During the first state of the second clock phase, when clock P2A is active, switches S8, S11 and S13 are turned on so that capacitors C2 and C3 are connected in series between the output node Vout and ground as shown in FIG. 13C. Finally, during the second state of the second phase, when clock P2B is active, the appropriate switches are turned on to connect capacitors C1 and C3 in series between the output node Vout and ground as shown in FIG. 13D.

The gain configuration of FIGS. 13A–13D differ from the previously described configurations in that the voltages across capacitors C1, C2 and C3 are not equalized. However, as was the case of the previously described embodiments, the voltage across each of the capacitors is forced to a predetermined value related to Vin and Vout since there is a fixed relationship between Vin and Vout. Stated in different terms, the voltage across the capacitors is set to a fixed proportion of the input voltage Vin.

Figure 13D:
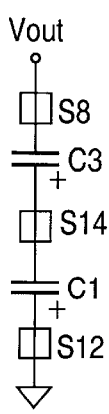
Figure 20A:
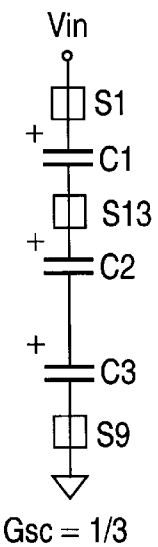
FIGS. 20A, 20B, 20C and 20D are equivalent circuits of the FIG. 10 array when switched to first, second, third and fourth states of operation, respectively, and which also produce a gain Gsc of 1/3.
Figure 20B:
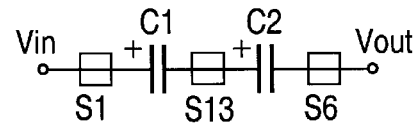
Figure 20C:
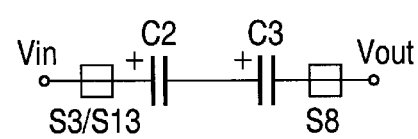
Figure 20D:
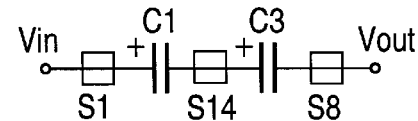

It can be seen by inspection of FIGS. 13A–13D that the voltage across each capacitors is fixed in terms of Vin and Vout therefore the voltage at the high impedance nodes intermediate the capacitors in FIGS. 13A, 13C and 13D will be at a known value which is a function of Vin and Vout. Since voltage VC3, the voltage across capacitor C3, is fixed at Vin (FIG. 13B), the magnitude of voltage VC2, the voltage across capacitor C2, will be fixed at the sum of Vin and Vout (FIG. 13C). Further, since voltage VC3 is fixed at Vin, the magnitude of VC1, the voltage across capacitor C1, will also be fixed at the sum of Vin and Vout (FIG. 13D). Thus, the voltage drop across capacitors C1 and C2 will both be equal in magnitude to Vin plus Vout and also to Vin/2 as indicated by FIG. 13A. Taking the polarities of the voltages into account, the following represents the input voltage Vin as indicated by FIG. 13A:

$$Vin = VC1 + VC2 \qquad (7)$$

or $$Vin = (-Vin - Vout) + (-Vin - Vout) \qquad (8)$$

Thus, Gsc=Vout/Vin=−3/2 as confirmed by the table of FIG. 39A.

FIGS. 14A and 14B show the equivalent circuits for providing a gain Gsc=−1. As indicated by the FIG. 39A table, clock phases P1 and P2 are used. Typically, clocks P2A and P2B will be produced from a single state clock P2. In any event, the single state clock phase P2 can be produced by "ORing" clocks P2A and P2B of FIGS. 6B and 6C together. During the first phase, when array 36 is in the first state, the voltage across capacitor C1 is at Vin and during the second phase, when the array is in the second state, the voltage across capacitor C1 is Vout so that Vin=Vout. A gain Gsc of −2/3 is produced by the gain configurations of FIGS. 15A, 15B, 15C and 15D. The FIG. 15A equivalent circuit occurs during clock P1 (FIG. 8A), as indicated by the table of FIG. 39A, with the equivalent circuits of FIGS. 15B, 15C and 15D occurring during clocks P2A (FIG. 8B), P2B (FIG. 8C) and P2C (FIG. 8D), respectively. During the three states of the second clock P2, the three capacitors C1, C2 and C3 are connected in series, two at a time, between the input Vin and ground. As previously described in connection with FIGS. 9A, 9B and 9C, this forces the voltages across each of the three capacitors to a set value. The voltage across the three capacitors of FIGS. 15A, 15B and 15C can be expressed as follows:

$$-Vout = VC1 + VC2 = VC2 + VC3 = VC3 + VC1 \quad (9)$$

or $$VC1 = VC2 = VC3 = -Vout/2 \quad (10)$$

Thus, the voltages at all of the high impedance nodes intermediate the capacitors are known. By inspection of FIG. 15A, the input voltage Vin is as follows:

$$Vin = -(VC1 + VC2 + VC3) = -3/2Vout \quad (11)$$

Thus, it can be seen from equation (11) that the gain Gsc=Vout/Vin=−2/3.

A similar analysis can be readily applied to the remaining configurations set forth in the tables of FIGS. 39A, 39B, 39D and 39E and the corresponding equivalent circuits shown in the drawings. FIGS. 16A, 16B and 16C are the equivalent circuits for producing a gain Gsc=−1/2. Note that the voltages across capacitors C1 and C2 are equalized in the second and third states as shown in FIGS. 16B and 16C by first connecting capacitor C1 between Vout and ground and then connecting capacitor C2 between Vout and ground.

FIGS. 17A, 17B, 17C and 17D are equivalent circuits of array 36 in first, second, third and fourth states, respectively, so as to provide a gain Gsc 1/3. The voltages are equalized to −Vout in the second, third and fourth states so that Vin is, based upon the first state, equal to −3(Vout) to provide the gain Gsc=Vout/Vin=−1/3.

FIGS. 18A, 18B, 18C and 18D are equivalent circuits of array 36 in four states for producing a gain Gsc=1/4. As shown by the table of FIG. 39B, the circuit of FIG. 18A is produced when clock P1 (FIG. 8A) is active, with the remaining three states being produced when clocks P2A, P2B and P2C (FIGS. 8B, 8C and 8D) are active. The voltages across the capacitors are equalized in the last three states to Vout. The circuit of FIG. 18A shows that Vout is equal to Vin −3(Vout) to achieve the gain of Gsc=1/4.

A gain Gsc of 1/3 is achieved by the four states represented by FIGS. 19A, 19B, 19C and 19D. The capacitor voltages are equalized to Vout during the last three states (FIGS. 19B, 19C and 19D), with Vin set equal to 3(Vout) in the first state to provide the gain of 1/3.

An alternative configuration for providing a gain Gsc of 1/3 is shown in FIGS. 20A, 20B, 20C and 20D. The capacitor voltages are equalized in the last three states (FIGS. 20B, 20C and 20D) to be equal to (Vin−Vout)/2. Inspection of FIG. 20A indicates that Vin is equal to 3(Vin−Vout)/2 so that Gsc=Vout/Vin=1/3.

Figure 21A:
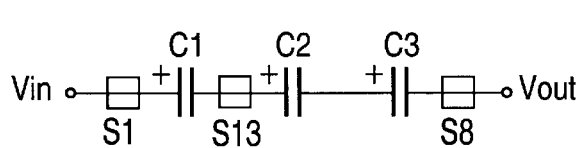
FIGS. 21A, 21B, 21C and 21D are equivalent circuits of the FIG. 10 array when switched to first, second, third and fourth states of operation, respectively, and which produce a gain Gsc of 2/5.
Figure 21B:
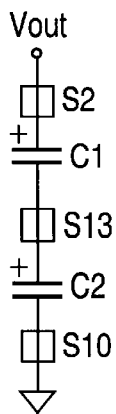
Figure 21C:
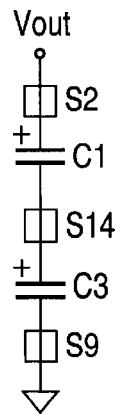
Figure 21D:
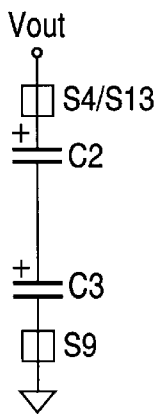
Figure 25A:
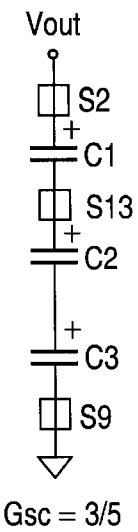
FIGS. 25A, 25B, 25C and 25D are equivalent circuits of the FIG. 10 array when switched to first, second, third and fourth states of operation, respectively, and which also produce a gain Gsc of 3/5.
Figure 25B:
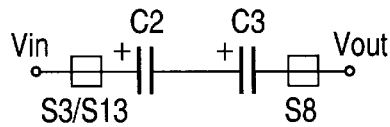
Figure 25C:
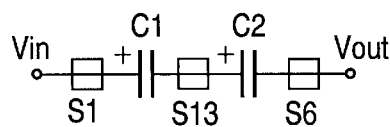
Figure 25D:
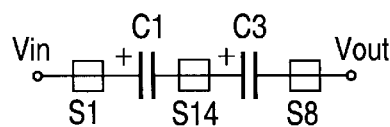

A gain Gsc of 2/5 is produced using the four states shown in FIGS. 21A, 21B, 21C and 21D. By inspecting FIGS. 21B, 21C and 21D, it can be determined that the voltages across the capacitors are equalized to Vout/2. Inspection of FIG. 21A shows that Vout=Vin −3(Vout)/2 to provide the gain Gsc=Vout/Vin=2/5.

An alternative configuration for producing a gain Gsc of 2/5 is shown in FIGS. 22A, 22B, 22C and 22D. As was the case for the gain of −3/2 previously described in connection with FIGS. 13A, 13B, 13C and 13D, the voltages across the capacitors are not equalized, but the voltages are nevertheless forced to a known value. As indicated by FIG. 22B, the voltage across capacitor C3 is forced to Vout during the second state of array 36. This occurs during the second state of the first phase, clock P1B (FIG. 40B), as indicated by the table of FIG. 39B. During the third state, when clock P2A is active, capacitor C3 is connected in series with capacitor C2 between Vin and Vout thereby forcing the voltage across capacitor C2 to a known value (VC2=Vin−2Vout). During the fourth state, when clock P2B is active, capacitor C3 is connected in series with capacitor C1 between Vin and Vout thereby forcing the voltage across capacitor C1 to the same value as capacitor C2 (VC1=Vin −2 Vout). During the first state when capacitors C1 and C2 are connected in series between Vout and ground (FIG. 22A), the value of Vout is 2(Vin−2 Vout) so that Gsc=Vout/Vin=2/5.

FIGS. 23A, 23B and 23C show the first, second and third states, respectively, of array 36 to produce a gain Gsc=1/2. The voltage across capacitors C1 and C3 are both set to (Vin−Vout) during the second state when clock P2A is active and during the third state when clock P2B is active. Thus, during the first state, when clock P1 is active, the input voltage Vin=2(Vin−Vout) so that Gsc=Vout/Vin=1/2.

FIGS. 24A, 24B and 24C show the first, second and third states, respectively, of array 36 as an alternative method of producing a gain Gsc=1/2. The voltage across capacitors C1 and C3 are both set to Vout during the second state when clock P2A is active and during the third state when clock P2B is active. Thus, during the first state, when clock P1 is active, the input voltage Vin=2Vout so that Gsc=Vout/Vin= 1/2.

A gain Gsc=3/5 is provided by the four array states of FIGS. 25A, 25B, 25C and 25D. As indicated by the table of FIG. 39B, the first state occurs when clock P1 (FIG. 8A) is active, The last three states (FIGS. 25B, 25C and 25D) occur when clocks P2A (FIG. 8B), P2B (FIG. 8C) and clock P2D (FIG. 8D) are active and function to equalize the three capacitor voltages to (Vin−Vout)/2. Thus, by inspection of FIG. 25A, it can be seen that Vout=3(Vin−Vout)/2. Thus Gsc=Vout/Vin=3/5.

Figure 26A:
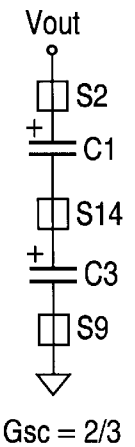
FIGS. 26A, 26B and 26C are equivalent circuits of the FIG. 10 array when switched to first, second and third states of operation, respectively, and which also produce a gain Gsc of 2/3.
Figure 26B:
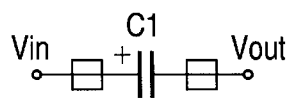
Figure 26C:
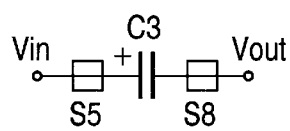
Figure 27A:
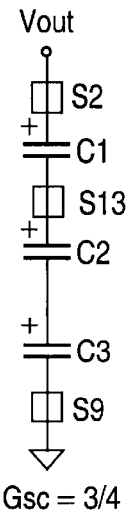
FIGS. 27A, 27B, 27C and 27D are equivalent circuits of the FIG. 10 array when switched to first, second and third states of operation, respectively, and which also produce a gain Gsc of 3/4.
Figure 27B:
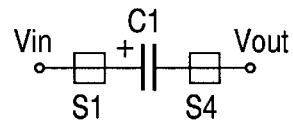
Figure 27C:
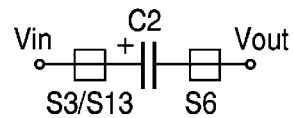
Figure 27D:
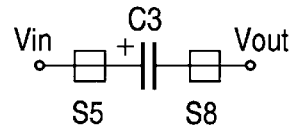

A gain Gsc=2/3 is produced by switching array 36 to the three states shown in FIGS. 26A, 26B and 26C.

As indicated by the FIG. 39C table, the first, second and third states are produced when clock P1 (FIG. 6A), P2A (FIG. 6B) and P2B (FIG. 6C) are active. During the last two states, the voltages across capacitors C1 and C3 are equalized to (Vin−Vout). Thus, by inspection of the FIG. 26A state, it can be seen that Vout=2(Vin−Vout) so that Gsc= Vout/Vin=2/3.

FIGS. 27A, 27B, 27C and 27D show the four states of array 36 that are active during clocks P1, P2A, P2B and P2C, respectively, to produce a gain Gsc=3/4. During the last three states, the voltage across each of the capacitors is set to (Vin−Vout). During the first state, inspection of FIG. 27A indicates that Vout=3(Vin−Vout) so that Gsc=Vout/Vin=3/4.

Figure 28A:
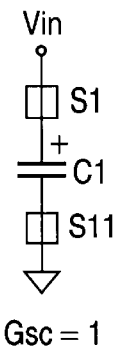
FIGS. 28A and 28B are equivalent circuits of the FIG. 10 array when switched to first and second states of operation, respectively, and which produce a gain Gsc of 1.
Figure 28B:
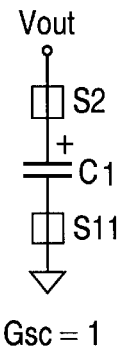
Figure 29:
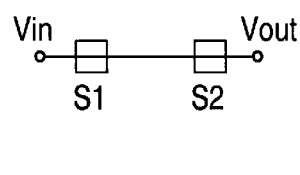
FIG. 29 is an equivalent circuit of the FIG. 10 array which also produces a gain Gsc of 1.
Figure 30A:
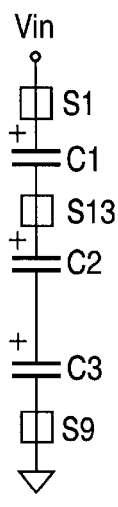
FIGS. 30A, 30B, 30C and 30D are equivalent circuits of the FIG. 10 array when switched to first, second, third and fourth states of operation, respectively, and which also produce a gain Gsc of 4/3.
Figure 30B:
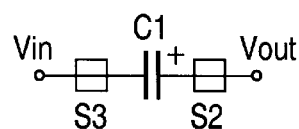
Figure 30C:
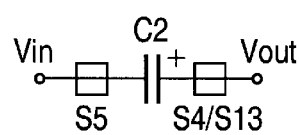
Figure 30D:
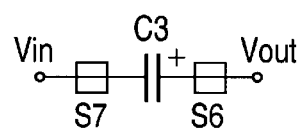

Two configurations of array 36 can be used to provide a gain Gsc of one. As indicated by FIGS. 28A and 28B, one approach is to set the voltage across capacitor C1 to Vin during the first state and then the connect capacitor C1 between the output node Vout and ground so that Vout is equal to Vin during the second state. The second approach is shown in FIG. 29 where switches S1 and S2 are closed when clock P1 is active thereby connecting the input and output nodes Vin and Vout directly together. The holding capacitor (not depicted) will maintain the output voltage when clock P2 is active.

FIGS. 30A, 30B, 30C and 30D show four states of array 36 which will produce a gain Gsc=4/3. The voltages across the three capacitors are forced during the last three states to Vout−Vin. Thus, examination of the first state shown in FIG. 38A shows that Vin=3(Vout−Vin) so Gsc=Vout/Vin=4/3.

Figure 31A:
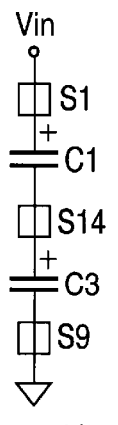
FIGS. 31A, 31B and 31C are equivalent circuits of the FIG. 10 array when switched to first, second and third states of operation, respectively, and which produce a gain Gsc of 3/2.
Figure 31B:
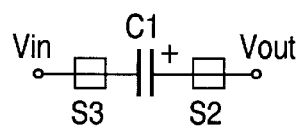
Figure 31C:
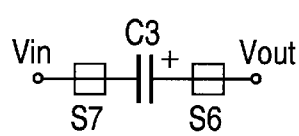
Figure 32A:
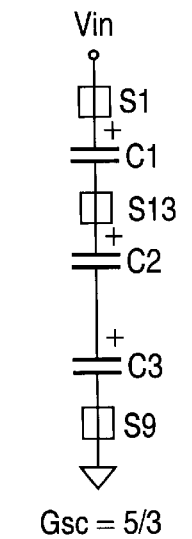
FIGS. 32A, 32B, 32C and 32D are equivalent circuits of the FIG. 10 array when switched to first, second, third and fourth states of operation, respectively, and which produce a gain Gsc of 5/3.
Figure 32B:
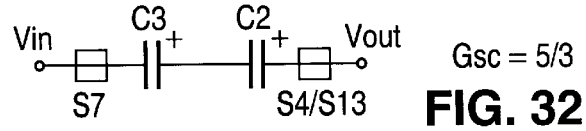
Figure 32C:
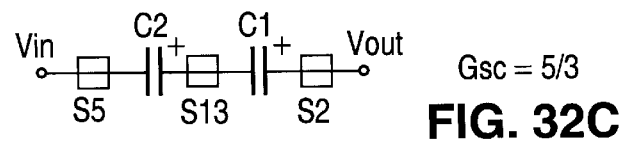
Figure 32D:
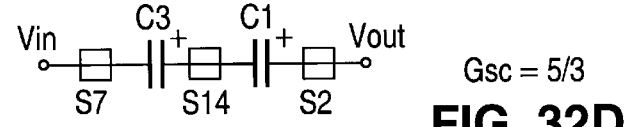

A gain Gsc of 3/2 is produced as shown by the three states of array 36 of FIGS. 31A, 31B and 31C. The voltages across capacitors C1 and C3 are set to Vin−Vout during the second and third states. The first state shown in FIG. 31A has the two capacitors connected in series between the input Vin and ground so that Vin=2(Vin−Vout) so that Vout/Vin is 3/2.

A gain Gsc of 5/3 is produced when array 36 is set to the four states shown in FIGS. 32A, 32B, 32C and 32D. As indicated by the table of FIG. 39D, the last three states are produced when clocks P2A, P2B and P2C are active. This causes the voltage across each of the three capacitors to be equal to (Vout−Vin)/2. When the three capacitors are connected in series between input Vin and ground (FIG. 32A), Vin=3(Vout−Vin)/2. Thus, Gsc=Vout/Vin=5/3.

Figure 33A:
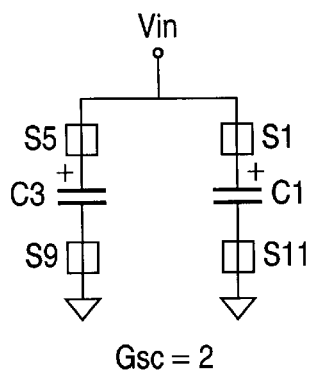
FIGS. 33A and 33B are equivalent circuits of the FIG. 10 array when switched to first and second states of operation, respectively, and which produce a gain Gsc of 2.
Figure 33B:
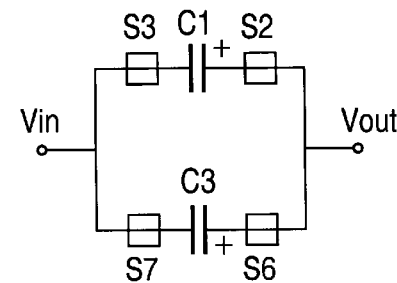
Figure 34A:
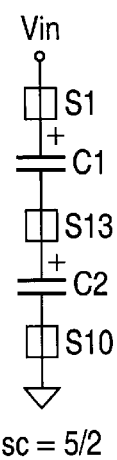
FIGS. 34A, 34B, 34C and 34D are equivalent circuits of the FIG. 10 array when switched to first, second, third and fourth states of operation, respectively, and which produce a gain Gsc of 5/2.
Figure 34B:
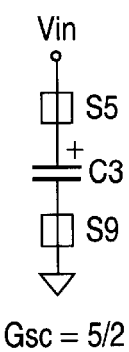
Figure 34C:
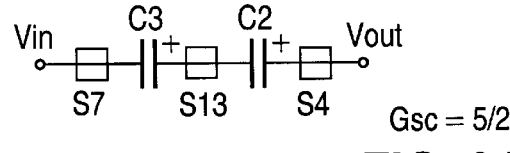
Figure 34D:
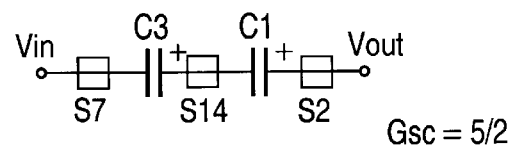

FIGS. 33A and 33B depict the two states of array 36 for producing a gain Gsc of 2. As shown in the table of FIG. 39D, the first and second states are entered when single state clocks P1 and P2 are active, respectively. As previously noted, clock P2 can be readily produced by "ORing" clocks P2A (FIG. 6B) and P2B (FIG. 6C) together. During either state, the capacitor voltage are equalized. In the second state the capacitor voltage are equal to (Vout−Vin) and in the first state, Vin=(Vout−Vin) so that Gsc=Vout/Vin 2.

Two approaches can be used to provide a gain Gsc of 5/2. FIGS. 34A, 34B, 34C and 34D show one approach using four states of array 36 where the voltages across the three capacitors are not equalized but nevertheless are forced to a known value in terms of Vin and Vout. Clocks P1A (FIG. 40A) and P1B (FIG. 40C) are active during the first and second states of FIGS. 34A and 34B, respectively. The voltage across capacitor C3 is set to Vin in the second state shown in FIG. 34B. The voltage across C2 and the voltage across C1 will be equal to one another as can be seen by inspecting the states of FIGS. 34C and 34D and thus will each be equal to Vin/2 as can be seen by inspecting the state of FIG. 34A. Thus, Vout=Vin+Vin/2+Vin, as indicated by either FIG. 34C or FIG. 34D, so as to produce a gain Gsc=Vout/Vin=5/2.

Figure 35A:
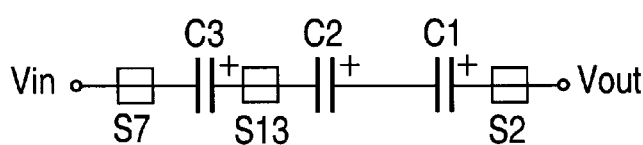
FIGS. 35A, 35B, 35C and 35D are equivalent circuits of the FIG. 10 array when switched to first, second, third and fourth states of operation, respectively, and which also produce a gain Gsc=5/2.
Figure 35B:
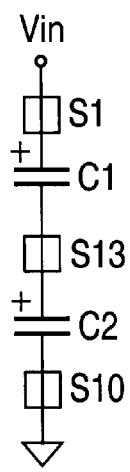
Figure 35C:
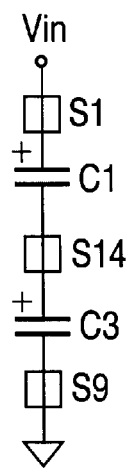
Figure 35D:
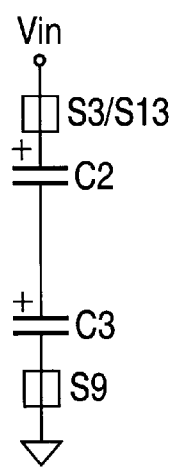

The second approach for providing a gain Gsc=5/2 is shown in FIGS. 35A, 35B, 35C and 35D. The states of FIGS. 35B, 35C and 35D force the voltages across the three capacitors to all be equal to Vin/2. Inspection of FIG. 35A shows that Vout=Vin+3(Vin/2) so that Gsc=Vout/Vin=5/2.

Figure 36A:
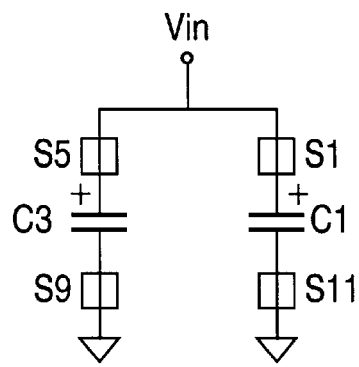
FIGS. 36A and 36B are equivalent circuits of the FIG. 10 array when switched to first and second states of operation, respectively, and which produce a gain Gsc of 3.
Figure 36B:
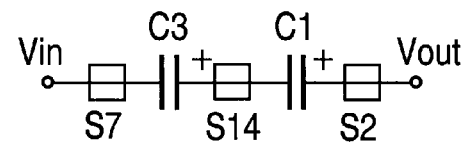

FIGS. 36A and 36B show the two states of array 36 for providing a gain Gsc of 3. The voltage across the two capacitors are equalized to Vin in the first state of FIG. 36A. Inspection of FIG. 36B shows that Vout=Vin+2Vin so that Gsc=Vout/Vin=3.

Another technique for providing a gain Gsc of 3 is shown in FIGS. 37A, 37B and 37C. The first two states of FIGS. 37A and 37B force the voltage drop across each capacitor to be equal to Vin. Inspection of FIG. 37C shows that Vout=3Vin so that Gsc=Vout/Vin=3.

A gain Gsc of 4 is shown in FIGS. 38A, 38B and 38C. The first two states shown in FIGS. 38A and 38B cause the voltage drop across each of the three capacitors to be equal to Vin. Inspection of FIG. 38C shows that Vout=Vin+3Vin so that Gsc=Vout/Vin=4.

The subject invention is not limited to the particular capacitor arrays 32, 34 and 36. Other arrays can be used which are switchable to more that two states and which operate to control the voltage across each capacitor to a known value in terms of voltages that appear on the array external nodes such as the input and output node voltages Vin and Vout and the ground node. This will cause any internal nodes, such as high impedance nodes intermediate series-connected capacitors, to be at a known voltage. One approach previously described is to connect the individual capacitor directly between two nodes to set the voltage across each capacitor as shown in FIGS. 38A and 38B, for example. Another approach previously described is to connect the three capacitors in series, two at a time, between two nodes, as shown in FIGS. 9B, 9C and 9D. A still further approach is to connect a first one of the capacitors directly between two external nodes as shown in FIG. 13B so that the first capacitor has a known voltage and to then connect the first capacitor in series with a second one of the remaining capacitors as shown in FIG. 13C to force the second capacitor to a known voltage. The first capacitor can then be connected in series with a third capacitor as shown in FIG. 13D so that the voltage across the third capacitor is a known voltage.

As a further example, FIGS. 41A, 41B and 41C show three states of another array, with the switches not being depicted, connected between external nodes X and Y. Nodes X and Y could, by way of example, be an input node Vin, output node Vout or ground. The array could, for example, be switched to the three states by clocks P2A, P2B and P2C of FIGS. 8B, 8C and 8D. Since all three of the capacitors are eventually connected in parallel with each other, the voltages across the three capacitors are made to be equal to one another. Inspection of any of FIGS. 41A, 41B and 41C shows that the voltage across each of the capacitors is a fixed value in terms of the voltages at the external nodes X and Y as follows:

$$VC1=VC2=VC3=(V_y-V_x)/2 \qquad (12)$$

Thus, when the capacitors are connected in a fourth state (not depicted), the voltage across each capacitor will be fixed even when the capacitors are connected in series with one another.

Thus, several embodiments of a switched capacitor array circuit and related method have been disclosed. Although these embodiments have been described in some detail, it is to be understood that certain changes can be made by those skilled in the art with out departing from the spirit and scope of the invention as defined by the appended claims.

What is claimed is:

1. A capacitor array circuit connected to an input node, an output node and a third node, said capacitor array circuit comprising:
   first and second capacitors, with each capacitor having first and second terminals;
   switching circuitry coupled to the first and second capacitors and to the input, output and third node;
   control circuitry coupled to the switching circuitry and operative to sequentially switch the array circuit through at least three different states so that a voltage developed across each of the first and second capacitors is a fixed proportion of a voltage at the input, node, so that the array circuit has a fixed gain when switched through the at least three different states, so that at least one of the first and second capacitors is connected intermediate two of the input, output and third nodes in each of the three states and so that each of the first and second capacitors has a connection relative to the input, output and third node which changes in at least one of the three states and wherein in at least one of the at least three different states, none of the first and second capacitors is connected between the input and output nodes.

2. The capacitor array circuit of claim 1 wherein the control circuitry operates to switch the array circuit to the first state with the first and second capacitors being connected in series between two of the nodes, to the second state where the first capacitor is connected between two of the nodes and the third state where the second capacitor is connected between two of the nodes.

3. The capacitor array circuit of claim 2 wherein in the first state, one of the two nodes is the third node and wherein in the second and third states, the two nodes are the input and output nodes.

4. The capacitor array circuit of claim 3 wherein in the first state, the two nodes are the input and third nodes.

5. The capacitor array circuit of claim 4 wherein the first terminals of the first and second capacitors are facing the input node in the first, second and third states.

6. The capacitor array circuit of claim 4 where the first terminals of the first and second capacitors are facing the third node in the first state and are facing the input node in the second and third states.

7. The capacitor array circuit of claim 3 wherein in the first state, the two nodes are the output and the third node.

8. The capacitor array circuit of claim 7 wherein the first terminals of the first and second capacitors are facing the output node in the first state and are facing the input nodes in the second and third states.

9. The capacitor array circuit of claim 7 wherein the first terminals of the first and second capacitors are facing the third node in the first state and are facing the input node in the second and third states.

10. The capacitor array circuit of claim 2 wherein in the first, second and third states, one of the two nodes is the third node.

11. The capacitor array circuit of claim 10 wherein in the first state, the first and second capacitors are connected in series between the output node and the third node, in the second state the first capacitor is connected between the input node and the third node and in the third state the second capacitor is connected between the input node and the third node.

12. The capacitor array circuit of claim 11 wherein the first terminals of the first and second capacitors are facing the output node in the first state and wherein the first terminals of the first and second capacitors are facing the input node in the second and third states.

13. The capacitor array circuit of claim 11 wherein the first terminals of the first and second capacitors are facing the third node in the first state and wherein the first terminals of the first and second capacitors are facing the input node in the second and third states.

14. The capacitor array circuit of claim 10 wherein in the first state, the first and second capacitors are connected in series between the input node and the third node, in the second state the first capacitor is connected between the output node and the third node and in the third state the second capacitor is connected between the output node and the third node.

15. The capacitor array circuit of claim 14 wherein in the first state, the first terminal of the first and second capacitors is facing the input node and in the second and third state, the first terminal of the first and second capacitor is facing the output node.

16. The capacitor array circuit of claim 14 wherein in the first state, the first terminal of the first and second capacitors is facing the third node and in the second and third state, the first terminal of the first and second capacitor is facing the output node.

17. The capacitor array circuit of claim 2 further including a third capacitor coupled to the switching circuitry, with the control circuitry operating to switch the array circuit through the at least three different states so that a voltage developed across the third capacitor is a fixed proportion of a voltage at the input node, with the first, second and third capacitors being connected in series between the two of the nodes in the first state and wherein in at least one of the first, second and third states, none of the first, second and third capacitors is connected between the input and the output nodes.

18. The capacitor array circuit of claim 17 wherein the third capacitor is connected in parallel with the first capacitor between two of the nodes in the second state and the second capacitor is connected between two of the nodes in the third state.

19. The capacitor array circuit of claim 18 wherein one of the nodes in the first state is the third node, one of the nodes in the second state is the third node and one of the nodes in the third state is the third node.

20. The capacitor array circuit of claim 19 wherein one of the nodes in the first state is the input node and one of the nodes in the second state is the output node and one of the nodes in the third state is the output node.

21. The capacitor array circuit of claim 19 wherein one of the nodes in the first state is the output node and one of the nodes in the second state is the input node and one of the nodes in the third state is the input node.

22. The capacitor array circuit of claim 2 further including a third capacitor coupled to the switching circuitry and having first and second terminals and wherein the control circuitry is operative to sequentially switch the array circuit through at least four different states so that a voltage is developed across each of the first, second and third capacitors that is a fixed proportion of a voltage at the input node.

23. The capacitor array circuit of claim 22, wherein in the first state one of the two nodes is the third node and the second one of the nodes of the second, third and fourth states is the third node.

24. The capacitor array of claim 23 wherein in the first state one of the two nodes is the third node and the second one of the nodes of the second, third and fourth states is the third node.

25. The capacitor array circuit of claim 24 wherein in the first state another of the two nodes is the input node and the first one of the nodes in the second, third and fourth states is the output node.

26. The capacitor array circuit of claim 25 wherein in the first state, the first terminals of the first, second and third capacitors are facing the input node and in the second, third and fourth states, the first terminals of the first, second and third capacitors are facing the third node.

27. The capacitor array circuit of claim 25 wherein in the first state, the first terminals of the first, second and third capacitors are facing the input node and in the second, third and fourth states, the first terminals of the first, second and third capacitors are facing the output node.

28. The capacitor array circuit of claim 23 wherein in the first state, the two of the nodes are the input and output nodes and wherein the first one of the nodes of the second, third and fourth states are one of the input and output nodes and the second one of the nodes of the second, third and fourth states are the third nodes.

29. The capacitor array circuit of claim 28 wherein the one of the input and output nodes of the second, third and fourth states is the output node.

30. The capacitor array circuit of claim 29 wherein the first terminals of the first, second and third capacitors are facing the input node in the first state and are facing the output node in the second, third and fourth states.

31. The capacitor array circuit of claim 28 wherein the one of the input and output nodes of the second, third and fourth states is the input node.

32. The capacitor array circuit of claim 31 wherein the first terminals of the first, second and third capacitors are facing the input node in the first state and are facing the third node in the second, third and fourth states.

33. The capacitor array circuit of claim 23 wherein in the second state, the first and second capacitors are connected in series between the first and second ones of the nodes, in the third state the second and third capacitors are connected in series between the first and second ones of nodes and in the fourth state the third and first capacitors are connected in series between the first and second ones of the nodes.

34. The capacitor array circuit of claim 33 wherein in the first state, the two of the nodes are the input and output nodes and wherein the first one of the nodes of the second, third and fourth states are one of the input and output nodes and the second one of the nodes of the second, third and fourth states are the third nodes.

35. The capacitor circuit of claim 34 wherein the one of the input and output nodes of the second, third and fourth states is the output node.

36. The capacitor array circuit of claim 35 wherein the first terminals of the first, second and third capacitors are facing the input node in the first state and are facing the output node in the second, third and fourth states.

37. The capacitor array circuit of claim 34 wherein the one of the input and output nodes of the second, third and fourth states is the input node.

38. The capacitor array circuit of claim 37 wherein the first terminals of the first, second and third capacitors are facing the input node in the first state and are facing the third node in the second, third and fourth states.

39. The capacitor array circuit of claim 33 wherein in the first state one of the two nodes is the third node and wherein in the second, third and fourth states the first one of the nodes is the input node and the second one of the nodes is the output node.

40. The capacitor array circuit of claim 39 wherein in the first state one of the two nodes is the input node.

41. The capacitor array circuit of claim 40 wherein the first terminals of the first, second and third capacitors are facing the input node in the first state and are facing the output node in the second, third and fourth states.

42. The capacitor array circuit of claim 40 wherein the first terminals of the first, second and third capacitors are facing the input node in the first state and are facing the input node in the second, third and fourth states.

43. The capacitor array circuit of claim 39 wherein in the first state one of the two nodes is the output node.

44. The capacitor array circuit of claim 43 wherein the first terminals of the first, second and third capacitors are facing the output node in the first state and are facing the input node in the second, third and fourth states.

45. The capacitor array circuit of claim 33 wherein in the first state, the two of the nodes are the input and third nodes and wherein the first one of the nodes of the second, third and fourth states are the output node and the second one of the nodes of the second, third and fourth states are the third node.

46. The capacitor array circuit of claim 45 wherein the first terminals of the first, second and third capacitors are facing the input node in the first state and are facing the third node in the second, third and fourth states.

47. The capacitor array circuit of claim 23 wherein in the first state one of the two nodes is the third node and in the second, third and fourth states, the first and second ones of the nodes are the input and output nodes, respectively.

48. The capacitor array circuit of claim 47 wherein in the first state another of the two nodes is the output node.

49. The capacitor array circuit of claim 48 wherein the first terminals of the first, second and third capacitors are facing the output node in the first state and are facing the input node in the second, third and fourth states.

50. The capacitor array circuit of claim 47 wherein in the first state another of the two nodes is the input node.

51. The capacitor array circuit of claim 50 wherein the first terminals of the first, second and third capacitors are facing the input node in the first state and are facing the output node in the second, third and fourth states.

52. The capacitor circuit of claim 22 wherein in the first state, the first and second capacitors are connected in series between first and second ones of the nodes, in the second state the third capacitor is connected between the first and second ones of the nodes, in the third state, the first and third capacitors are connected in series between third and fourth ones of the nodes and in the fourth state the second and third ones of the capacitors are connected in series between the third and fourth ones of the nodes.

53. The capacitor array circuit of claim 52 wherein the first and second ones of the nodes in the first and second states are the output and third node, respectively, and the third and fourth ones of the nodes in the third and fourth states are the input and output nodes, respectively.

54. The capacitor array circuit of claim 53 wherein the first terminals of the first, second and third capacitors are facing the output node in the first and second states and are facing the input node in the third and fourth states.

55. The capacitor array circuit of claim 52 wherein the first and second ones of the nodes in the first and second states are the input and third node, respectively, and the third and fourth ones of the nodes in the third and fourth states are the output and third nodes, respectively.

56. The capacitor array circuit of claim 55 wherein the first terminals of the first, second and third capacitors are facing the input node in the first and second states and are facing the output node in the third and fourth states.

57. The capacitor array circuit of claim 52 wherein the first and second ones of the nodes in the first and second states are the input and third node, respectively, and the third and fourth ones of the nodes in the third and fourth states are the input and output nodes, respectively.

58. The capacitor array circuit of claim 57 wherein the first terminals of the first, second and third capacitors are facing the input node in the first and second states and are facing the output node in the third and fourth states.

59. A capacitor array circuit connected to an input node, an output node and a third node, said capacitor array circuit comprising:

first and second capacitors, with each capacitor having first and second terminals;

switching circuitry coupled to the first and second capacitors and to the input, output and third node;

control circuitry operative to sequentially switch the array circuit through first, second and third different states, wherein in the first state the first and second capacitors are connected in series between two of the nodes, in the second state, the first capacitor is connected between two of the nodes and in the third state the second capacitor is connected between two of the nodes and wherein the array circuit has a fixed gain when the array circuit is switched through the first, second and third states and in at least one of the first, second and third states, none of the first and second capacitors is connected between the input and output nodes.

60. The capacitor array circuit of claim 59 wherein the first and second capacitors are connected between the input and output nodes in the first state and the first capacitor is connected between input and output nodes in the second state and the second capacitor is connected between the input and output nodes in the third state.

61. The capacitor array circuit of claim 60 wherein the first terminals of the first and second capacitors are facing the input node in the first state and are facing the output node in the second and third state.

62. The capacitor array circuit of claim 60 wherein the first terminals of the first and second capacitors are facing the input node in the first state and are facing the input node in the second and third state.

63. The capacitor array circuit of claim 60 wherein the first terminals of the first and second capacitors are facing the input node in the first state and are facing the output node in the second and third state.

64. The capacitor array circuit of claim 59 wherein the first and second capacitors are connected between the input and third nodes in the first state, the first capacitor is connected between the output and third nodes in the second state and the second capacitor is connected between the output and third nodes in the third state.

65. The capacitor array circuit of claim 64 wherein the first terminals of the first and second capacitors are facing the input node in the first state and are facing the output node in the second and third state.

66. The capacitor array circuit of claim 64 wherein the first terminals of the first and second capacitors are facing the input node in the first state and are facing the third node in the second and third state.

67. The capacitor array circuit of claim 59 wherein the first and second capacitors are connected between the input and third nodes in the first state, the first capacitor is connected between the input and output nodes in the second state and the second capacitor is connected between the input and output nodes in the third state.

68. The capacitor array circuit of claim 67 wherein the first terminals of the first and second capacitors are facing the output node in the first state and are facing the input node in the second and third state.

69. The capacitor array circuit of claim 59 further including a third capacitor having first and second terminals and coupled to the switching circuitry and wherein the control circuitry is operative to sequentially switch the array circuit through first, second, third and fourth states, wherein in the first state the first, second and third capacitors are connected in series between two of the nodes, in the second state the first capacitor is connected between two of the nodes, in the third state the second capacitor is connected between two of the nodes and in the fourth state the third capacitor is connected between two of the nodes and wherein in at least one of the first, second, third and fourth states, none of the first, second and third capacitors is connected between the input and output nodes.

70. The capacitor array circuit of claim 69 wherein the first, second and third capacitors are connected between the input and the third nodes in the first state and the first, second and third capacitors are connected between the output and third nodes in the second, third and fourth states, respectively.

71. The capacitor array circuit of claim 70 wherein the first terminals of the first, second and third capacitors are facing the input node in the first state and are facing the third node in the second, third and fourth states.

72. The capacitor array circuit of claim 70 wherein the first terminals of the first, second and third capacitors are facing the input node in the first state and are facing the output node in the second, third and fourth states.

73. The capacitor array circuit of claim 70 wherein the first and second capacitors are connected in series between the output and third nodes in the second state, the second and third capacitors are connected in series between the output and third nodes in the third state and the third and first capacitors are connected between the output and the third nodes in the fourth state.

74. The capacitor array circuit of claim 73 wherein the first terminals of the first, second and third capacitors are facing the input node in the first state and are facing the output node in the second, third and fourth states.

75. The capacitor array circuit of claim 69 wherein the first, second and third capacitors are connected between the output and third nodes in the first state and first, second and third capacitors are connected between the input and output nodes in the second, third and fourth states, respectively.

76. The capacitor array circuit of claim 75 wherein the first terminals of the first, second and third capacitors are facing the output node in the first state and are facing the input node in the second, third and fourth states.

77. The capacitor array circuit of claim 69 wherein in the second state the first and second capacitors are connected in series between two of the nodes, in the third state the second and third capacitors are connected in series between two of the nodes and in the fourth state the third and first capacitors are connected in series between two of the nodes.

78. The capacitor array circuit of claim 77 wherein the first, second and third capacitors are connected between the input and third nodes in the first state, the first and second capacitor are connected between the input and output nodes in the second state, the second and third capacitors are connected between the input and output nodes in the third state and the third and first capacitors are connected between the input and output nodes in the fourth state.

79. The capacitor array circuit of claim 78 wherein the first terminals of the first, second and third capacitors are facing the input node in the first state and are facing the output node in the second, third and fourth states.

80. The capacitor array circuit of claim 78 wherein the first terminals of the first, second and third capacitors are facing the input node in the first state and are facing the input node in the second, third and fourth states.

81. The capacitor array circuit of claim 77 wherein the first, second and third capacitors are connected between the output and third nodes in the first state, the first and second capacitor are connected between the input and output nodes in the second state, the second and third capacitors are connected between the input and output nodes in the third state and the third and first capacitors are connected between the input and output nodes in the fourth state.

82. The capacitor array circuit of claim 81 wherein the first terminals of the first, second and third capacitors are facing the output node in the first state and facing the input node in the second, third and fourth states.

83. The capacitor array circuit of claim 77 wherein the first, second and third capacitors are connected between the input and third nodes in the first state, the first and second capacitor are connected between the output and third nodes in the second state, the second and third capacitors are connected between the output and third nodes in the third state and the third and first capacitors are connected between the output and third nodes in the fourth state.

84. The capacitor array circuit of claim 83 wherein the first terminals of the first, second and third capacitors are facing the input node in the first state and are facing third node in the second, third and fourth states.

85. The capacitor array circuit of claim 77 wherein the first, second and third capacitors are connected between the input and output nodes in the first state, the first and second capacitor are connected between the output and third nodes in the second state, the second and third capacitors are connected between the output and third nodes in the third state and the third and first capacitors are connected between the output and third nodes in the fourth state.

86. The capacitor array circuit of claim 85 wherein the first terminals of the first, second and third capacitors are facing the input node in the first state and are facing the output node in the second, third and fourth states.

87. The capacitor array circuit of claim 77 wherein the first, second and third capacitors are connected between the input and output nodes in the first state, the first and second capacitor are connected between the input and third nodes in the second state, the second and third capacitors are connected between the input and third nodes in the third state and the third and first capacitors are connected between the input and third nodes in the fourth state.

88. The capacitor array circuit of claim 87 wherein the first terminals of the first, second and third capacitors are facing the output node in the first state and are facing the input node in the second, third and fourth states.

89. The capacitor array circuit of claim 59 further including a third capacitor having first and second terminals and coupled to the switching circuitry and wherein the control circuitry is operative to sequentially switch the array circuit through first, second, third and fourth states, wherein in the first state the first and second capacitors are connected in series between two of the nodes, in the second state the third capacitor is connected between two of the nodes, in the third state the first and third capacitors are connected in series between two of the nodes and in the fourth state the second and third capacitors are connected between two of the nodes.

90. The capacitor array circuit of claim 89 wherein in first state the first and second capacitors are connected between the input and third nodes, in the second state the third capacitor is connected between the input and third nodes, in the third state the first and second capacitors are connected between the output and third nodes and in the fourth state the second and third capacitors are connected between the output and third nodes.

91. The capacitor array circuit of claim 90 wherein the first terminals of the first, second and third capacitors are facing the input node in the first and second stages and are facing the third node in the third and fourth states.

92. The capacitor array circuit of claim 89 wherein in first state the first and second capacitors are connected between the input and third nodes, in the second state the third capacitor is connected between the input and third nodes, in the third state the first and second capacitors are connected between the input and output nodes and in the fourth state the second and third capacitors are connected between the input and output nodes.

93. The capacitor array circuit of claim 92 wherein the first terminals of the first, second and third capacitors are facing the input node in the first and second states and are facing the output node in the third and fourth state.

94. The capacitor array circuit of claim 59 further including a third capacitor having first and second terminals and coupled to the switching circuitry and wherein the control circuitry is operative to sequentially switch the array circuit through first, second and third states, wherein in the first state the first, second and third capacitors are connected in series between two of the nodes, in the second state the first and second capacitors are connected in parallel between two of the nodes and in the third state the third capacitor is connected between two of the nodes and wherein in at least one of the first, second and third states, none of the first, second and third capacitors is connected between the input and output nodes.

95. The capacitor array circuit of claim 94 wherein the first, second and third capacitors are connected in series between one of the input and output nodes and the third node in the first state, the first and second capacitors are connected in parallel between one of the input and output nodes and the third node in the second state and the third capacitor is connected between one of the input and output nodes and the third node in the third state.

96. The capacitor of claim 95 wherein in the first state the one of the input and output nodes is the output node and in the second and third states the one of the input and output nodes is the input node.

97. The capacitor of claim 96 wherein the first terminals of the first, second and third capacitors are facing the output node in the first state and are facing the input nodes in the second and third state.

98. The capacitor array circuit of claim 69 wherein the second capacitor is connected in series with the first capacitor between two of the nodes in the second state, the third capacitor is connected in series with the second capacitor between two of the nodes in the third state and the first capacitor is connected in series with the third capacitor between two of the nodes in the fourth state.

99. The capacitor array circuit of claim 98 wherein the first, second and third capacitors are connected in series between the input and third nodes in the first state, the first and second capacitors are connected in series between the output node and the third node in the second state, the second and third capacitors are connected in series between the output node and the third node in the third state and the third and first capacitors are connected in series between the output node an the third node in the fourth state.

100. The capacitor array circuit of claim 98 wherein the first, second and third capacitors are connected in series between the input and third nodes in the first state, the first and second capacitors are connected in series between the input node and the output node in the second state, the second and third capacitors are connected in series between the input node and the output node in the third state and the third and first capacitors are connected in series between the input node and the output node in the fourth state.

101. The capacitor array circuit of claim 98 wherein the first, second and third capacitors are connected in series between the output and third nodes in the first state, the first and second capacitors are connected in series between the input node and the output node in the second state, the second and third capacitors are connected in series between the input node and the output node in the third state and the third and first capacitors are connected in series between the input node an the output node in the fourth state.

102. A method of controlling a capacitor array circuit coupled to an input node, an output node and a third node, with the circuit including first and second capacitors, said method comprising:

switching the array circuit to a first state where the first and second capacitors are connected in series between two of the nodes;

switching the array circuit from the first state to a second state, different than the first state and where at least one of the first and second capacitors is connected between two of the input, output and third nodes;

switching the array circuit from the second state to a third state, different than the first and second states and where at least one of the first and second capacitors is connected between two of the input, output and third nodes, so that a voltage across each capacitor is a fixed proportion of a voltage at the input node and so that the array circuit has a fixed gain when the array circuit is in the first, second and third states and wherein in at least one of the first, second and third states, none of the first and second capacitors is connected between the input and output nodes.

103. The method of claim 102 wherein the second state, the first capacitor is connected between a first pair of the nodes and wherein in the third state, the second capacitor is connected between the first pair of the nodes.

104. The method of claim 103 wherein the first and second capacitors are connected in series between the third node and another one of the nodes in the first state and wherein first pair of the nodes in the second and third states are the input and output nodes.

105. The method of claim 102 wherein the capacitor array circuit further includes a third capacitor and wherein the switching the array circuit from the first state to the second state and the switching the array circuit from the second state to the third state results in the voltages across each of the capacitors is a fixed proportion of a voltage at the input node and wherein in at least one of the first, second and third states, none of the first, second and third capacitors is connected between the input and output nodes.

106. The method of claim 105 wherein the first, second and third capacitors are connected in series between two of the nodes in the first state.

107. The method of claim 105 further including switching the array circuit from the third state to a fourth state different from the first, second and third states.

108. The method of claim 107 wherein each of the second, third and fourth states, at least one of the first, second and third capacitors is connected between two of the nodes.

109. The method of claim 108 wherein in the first state one of the two nodes is the third node and in each of the second, third and fourth states, at least one of the first, second and third capacitors is connected between the input and output nodes.

110. A method of controlling a capacitor array circuit coupled to an input node an output node and a third node, with the circuit including first, second and third capacitors, said method comprising:
switching the array circuit to a first state where the first and second capacitors are connected in series between two of the nodes;
switching the array circuit from the first state to a second state, different than the first state where at least one of the capacitors is connected between two of the nodes;
switching the array circuit from the second state to a third state, different than the first and second states, where at least one of the capacitors is connected between two of the nodes; and
switching the array circuit from the third state to a fourth state, different from the first, second and third states, where at least one of the capacitors is connected between two of the nodes and wherein the array circuit has a fixed array gain in the first, second and third states and wherein in at least one of the first, second, third and fourth states, none of the first, second and third capacitors is connected between the input and output nodes.

111. The method of claim 110 wherein in the first state, the first and second capacitors are connected in series between the third node and another one of the nodes, wherein at least one of the capacitors is connected between the input and the output nodes in each of the second, third and fourth states.

112. The method of claim 111 wherein the first, second and third capacitors are connected in series in the first state.

113. The method of claim 112 wherein the first second and third capacitors are respectively connected between two of the nodes in the second, third and fourth states, respectively.

114. The method of claim 113 wherein the first and second capacitors are connected in series between a pair of the nodes in the second state, the second and third capacitors are connected in series between the pair of the nodes in the third state and the third and first capacitors are connected in series between the pair of the nodes in the fourth state.

115. A capacitor array circuit connected to an input node, an output node and a third node, said capacitor array circuit comprising:
first, second and third capacitors, with each capacitor having first and second terminals;
switching circuitry coupled to the first, second and third capacitors and to the input, output and third node;
control circuitry coupled to the switching circuitry and operative to sequentially switch the array circuit through at least three different states so that a voltage developed across each of the first, second and third capacitors is a fixed proportion of a voltage at the input node and wherein the array circuit has a fixed array gain in the first, second and third states, wherein each of the first, second and third capacitors is connected intermediate two of the input, output and third nodes in each of the first, second and third states and wherein in at least one of the first, second and third states, none of the first, second and third capacitors is connected between the input and output nodes.

116. The capacitor array circuit of claim 115 wherein the first, second and third capacitors are connected in series between two of the nodes in the first state.

117. The capacitor array circuit of claim 116 wherein the third capacitor is connected in parallel with the first capacitor between two of the nodes in the second state and the second capacitor is connected between two of the nodes in the third state.

118. The capacitor array circuit of claim 117 wherein one of the nodes in the first state is the third node, one of the nodes in the second state is the third node and one of the nodes in the third state is the third node.

119. The capacitor array circuit of claim 118 wherein one of the nodes in the first state is the input node and one of the nodes in the second state is the output node and one of the nodes in the third state is the output node.

120. The capacitor array circuit of claim 118 wherein one of the nodes in the first state is the output node and one of the nodes in the second state is the input node and one of the nodes in the third state is the input node.

121. The capacitor array circuit of claim 118 wherein the nodes in the first state are the input and output nodes, the nodes in the second and third states are the input and third node.

122. The capacitor array circuit of claim 121 wherein the first terminals of the first, second and third capacitors are facing the output node in the first state, the first terminals of the first and third capacitors are facing the input node in the second state and the first terminal of the second capacitor is facing input node in the third state.

* * * * *

UNITED STATES PATENT AND TRADEMARK OFFICE
CERTIFICATE OF CORRECTION

PATENT NO.   : 6,563,235 B1
DATED        : May 13, 2003
INVENTOR(S)  : McIntyre et al.

It is certified that error appears in the above-identified patent and that said Letters Patent is hereby corrected as shown below:

Column 14,
Line 45, "," between "input" and "node" should be deleted.

Column 21,
Line 41, between "in" and "first" insert -- the --.

Column 22,
Line 30, "an" should be deleted and replaced with -- and --.

Column 23,
Line 37, between "input node" and "an" insert -- , --.

Column 24,
Line 3, between "first" and "second" insert -- , --.

Signed and Sealed this

Eighth Day of July, 2003

JAMES E. ROGAN
*Director of the United States Patent and Trademark Office*